United States Patent
Chande et al.

(10) Patent No.: US 11,432,333 B2
(45) Date of Patent: Aug. 30, 2022

(54) TECHNIQUES FOR USING MULTIPLE SETS OF UPLINK RESOURCES IN A RANDOM ACCESS PROCEDURE

(71) Applicant: QUALCOMM Incorporated, San Diego, CA (US)

(72) Inventors: Vinay Chande, San Diego, CA (US); Xiaoxia Zhang, San Diego, CA (US); Tao Luo, San Diego, CA (US); Arumugam Chendamarai Kannan, San Diego, CA (US); Jing Sun, San Diego, CA (US); Makesh Pravin John Wilson, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 16/773,825

(22) Filed: Jan. 27, 2020

(65) Prior Publication Data

US 2020/0245371 A1   Jul. 30, 2020

Related U.S. Application Data

(60) Provisional application No. 62/797,645, filed on Jan. 28, 2019.

(51) Int. Cl.
   *H04W 74/08* (2009.01)
   *H04W 72/14* (2009.01)
   (Continued)

(52) U.S. Cl.
   CPC ....... *H04W 74/0833* (2013.01); *H04W 72/04* (2013.01); *H04W 72/1278* (2013.01); *H04W 72/14* (2013.01); *H04W 76/10* (2018.02)

(58) Field of Classification Search
   CPC ..... H04W 72/04; H04W 72/14; H04W 74/08; H04W 72/1278
   See application file for complete search history.

(56) References Cited

U.S. PATENT DOCUMENTS

| 2006/0041878 A1* | 2/2006 | Albot ............. G06F 8/65 |
| | | 717/162 |
| 2013/0010712 A1* | 1/2013 | Kim ............. H04L 12/413 |
| | | 370/329 |

(Continued)

FOREIGN PATENT DOCUMENTS

WO   WO-2019018799 A1   1/2019

OTHER PUBLICATIONS

International Search Report and Written Opinion—PCT/US2020/015483—ISA/EPO—dated Apr. 8, 2020.

(Continued)

*Primary Examiner* — Raj Jain
(74) *Attorney, Agent, or Firm* — Liem T. Do

(57) ABSTRACT

A user equipment (UE) may transmit a random access request message to a base station in a random access procedure to access a wireless network. In response, the base station may transmit a random access response message to the UE including an uplink grant for a first set of uplink resources for the UE to transmit a radio resource control (RRC) message. The UE may determine a second set of uplink resources for transmitting the RRC message, for example, based on additional uplink grants received in the random access response message. Additionally or alternatively, the UE may derive additional grants implicitly from the first uplink grant received from the base station. The UE may transmit the RRC message to the base station using the first and/or second sets of uplink resources and establish a (Continued)

connection based on the RRC message for subsequent uplink and downlink communications.

30 Claims, 23 Drawing Sheets

(51) Int. Cl.
*H04W 72/04* (2009.01)
*H04W 76/10* (2018.01)
*H04W 72/12* (2009.01)

(56) References Cited

U.S. PATENT DOCUMENTS

| | | | |
|---|---|---|---|
| 2018/0176949 A1 | 6/2018 | Islam et al. | |
| 2018/0199381 A1* | 7/2018 | Rong | H04W 74/08 |
| 2018/0302895 A1* | 10/2018 | Akkarakaran | H04L 5/0082 |
| 2018/0368107 A1* | 12/2018 | Babaei | H04L 27/2608 |
| 2019/0014590 A1* | 1/2019 | Zander | H04W 4/06 |
| 2020/0245371 A1* | 7/2020 | Chande | H04W 72/04 |

OTHER PUBLICATIONS

LG Electronics Inc: "Enhanced RACH Procedure for NR-U", 3GPP Draft, 3GPP TSG-RAN WG2 #104, R2-1818100 Enhanced RACH Procedure for NR-U, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), XP051557606, 4 Pages, Retrieved from the Internet: URL: http://www.3gpp.org/ftp/Meetings%5F3GPP%5FSYNC/RAN2/Docs/R2%2D1818100%2Ezip, [retrieved on Nov. 12, 2018], the whole document.

VIVO: "Enhance RACH with Additional Transmission Opportunities", 3GPP Draft, 3GPP TSG-RAN WG2 Meeting #104, R2-1818258 Enhance RACH with Additional Transmission Opportunities, 3rd Generation Partnership Project (3GPP), Mobile Competence Centre, 650, Route Des Lucioles , F-06921 Sophia-Antipolis, vol. RAN WG2, No. Spokane, USA, Nov. 12, 2018-Nov. 16, 2018, Nov. 12, 2018 (Nov. 12, 2018), XP051557759, 6 Pages, Retrieved from the Internet: URL: http://www.3gpp.org/ftp/Meetings%5F3GPP%5FSYNC/RAN2/Docs/R2%2D1818258%2Ezip, [retrieved on Nov. 12, 2018], the whole document.

* cited by examiner

TECHNIQUES FOR USING MULTIPLE SETS OF UPLINK RESOURCES IN A RANDOM ACCESS PROCEDURE

CROSS REFERENCE

The present Application for Patent claims the benefit of U.S. Provisional Patent Application No. 62/797,645 by CHANDE et al., entitled "TECHNIQUES FOR USING MULTIPLE SETS OF UPLINK RESOURCES IN A RANDOM ACCESS PROCEDURE," filed Jan. 28, 2019, assigned to the assignee hereof, and expressly incorporated by reference in its entirety.

BACKGROUND

The following relates generally to wireless communications, and more specifically to techniques for using multiple sets of uplink resources in a random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

To access a wireless network, a UE may perform a random access procedure with a base station using a set of resources (e.g., a set of time, frequency, and/or spatial resources). In some cases, other communications devices (e.g., other UEs, base stations, etc.) in the vicinity may communicate transmissions using a set of resources at least partially overlapping the set of resources to be used for the random access procedure. In some cases, a message communicated as part of the random access procedure between the UE and the base station may collide with the communications between the nearby communications device (e.g., when the communications are transmitted using overlapping sets of resources). The collision may cause the UE to fail to successfully perform the random access procedure, in which case the UE may restart a new random access procedure to again attempt to access the wireless network.

SUMMARY

The described techniques relate to improved methods, systems, devices, and apparatuses that support techniques for using multiple sets of uplink resources in a random access procedure. Generally, the described techniques provide for a user equipment (UE) performing a random access procedure (e.g., a random access channel (RACH) procedure) with a base station to access a wireless network. In the random access procedure, the UE and base station may communicate, for example, a random access request message, a random access response message, a radio resource control (RRC) connection request message, and/or a contention resolution message. Each of the messages may be communicated using respective sets of resources (e.g., a set of time, frequency, and/or spatial resources). In some cases, the UE and base station may perform listen-before-talk (LBT) procedures before one or more of the messages of the random access procedure, for example, to prevent collisions with communications from other nearby wireless communications devices (e.g., in a shared or unlicensed radio frequency spectrum bandwidth).

To start the random access procedure, the UE may transmit a random access request message to the base station using a set of resources (e.g., a set of RACH resources). The random access request message may be, for example, a physical random access channel (PRACH) transmission transmitted using a set of resources allocated for PRACH transmissions. In some cases, the random access request message may, for example, include a random access preamble that identifies the random access request message corresponding to the UE. In response to the random access request message, the base station may transmit to the UE a random access response message, where the random access response message may include a grant for a first set of uplink resources (e.g., a set of time, frequency, and/or spatial resources) for transmitting the RRC connection request message to the base station.

In some cases, the UE may further determine a second set of uplink resources for transmitting the RRC connection request message to the base station based on the grant for the first set of uplink resources. For example, the base station may convey multiple uplink grants to the UE, where each uplink grant indicates a respective allocation of set of uplink resources with which the UE may transmit the RRC connection request message (or, multiple repetitions of the RRC connection request message). Alternatively, the UE may derive one or more additional grants implicitly based on the first uplink grant received from the base station, the derived grants similarly indicating respective allocations of sets of uplink resources for the UE to transmit the RRC connection request message. The UE may transmit the RRC connection request message to the base station using one or more of the first set of uplink resources or the second set of uplink resources. Based on the RRC connection request message, the UE and base station may establish a configured connection for communicating subsequent uplink and downlink messages.

A method of wireless communications at a UE is described. The method may include transmitting a random access request message to a base station, receiving a random access response message from the base station in response to the random access request message, the random access response message including a grant for a first set of uplink resources for transmitting an RRC connection request message to the base station, determining at least a second set of uplink resources for transmitting the RRC connection request message to the base station based on the grant for the first set of uplink resources, transmitting the RRC connection request message to the base station using one or more of the first set of uplink resources or the second set of uplink resources, and establishing a connection with the base station based on the RRC connection request message.

An apparatus for wireless communications at a UE is described. The apparatus may include a processor, memory in electronic communication with the processor, and instructions stored in the memory. The instructions may be executable by the processor to cause the apparatus to transmit a random access request message to a base station, receive a random access response message from the base station in response to the random access request message, the random access response message including a grant for a first set of uplink resources for transmitting an RRC connection request message to the base station, determine at least a second set of uplink resources for transmitting the RRC connection request message to the base station based on the grant for the first set of uplink resources, transmit the RRC connection request message to the base station using one or more of the first set of uplink resources or the second set of uplink resources, and establish a connection with the base station based on the RRC connection request message.

Another apparatus for wireless communications at a UE is described. The apparatus may include means for transmitting a random access request message to a base station, receiving a random access response message from the base station in response to the random access request message, the random access response message including a grant for a first set of uplink resources for transmitting an RRC connection request message to the base station, determining at least a second set of uplink resources for transmitting the RRC connection request message to the base station based on the grant for the first set of uplink resources, transmitting the RRC connection request message to the base station using one or more of the first set of uplink resources or the second set of uplink resources, and establishing a connection with the base station based on the RRC connection request message.

A non-transitory computer-readable medium storing code for wireless communications at a UE is described. The code may include instructions executable by a processor to transmit a random access request message to a base station, receive a random access response message from the base station in response to the random access request message, the random access response message including a grant for a first set of uplink resources for transmitting an RRC connection request message to the base station, determine at least a second set of uplink resources for transmitting the RRC connection request message to the base station based on the grant for the first set of uplink resources, transmit the RRC connection request message to the base station using one or more of the first set of uplink resources or the second set of uplink resources, and establish a connection with the base station based on the RRC connection request message.

Some examples of the method, apparatuses, and non-transitory computer-readable medium described herein may further include operations, features, means, or instructions for receiving a multiple grant configuration in a system information block (SIB) message, a remaining minimum system information (RMSI) message, a dedicated signaling message, or a combination thereof. Some examples of the method, apparatuses, and non-transitory computer-readable medium described herein may further include operations, features, means, or instructions for determining at least the second set of uplink resources for transmitting the RRC connection request message to the base station based on the multiple grant configuration. In some examples of the method, apparatuses, and non-transitory computer-readable medium described herein, the multiple grant configuration indicates a maximum number of grants, a relationship between the first set of uplink resources and the second set of uplink resources, a modulation and coding scheme (MCS), or a combination thereof.

Some examples of the method, apparatuses, and non-transitory computer-readable medium described herein may further include operations, features, means, or instructions for repeating transmission of the RRC connection request message to the base station using one or more of the first set of uplink resources or the second set of uplink resources. In some examples of the method, apparatuses, and non-transitory computer-readable medium described herein, the random access response message includes grant multiplicity information, the grant multiplicity information indicating a number of grants to be used for repeating transmission of the RRC connection request message, and where repeating transmission of the RRC connection request message to the base station may be based on the grant multiplicity information.

In some examples of the method, apparatuses, and non-transitory computer-readable medium described herein, the random access response message includes one or more additional grants for at least the second set of uplink resources, and determining at least the second set of uplink resources may be based on the one or more additional grants. In some examples of the method, apparatuses, and non-transitory computer-readable medium described herein, each of the grant and the one or more additional grants includes a random access preamble identifier for transmitting the RRC connection request message, each of the random access preamble identifiers of each of the grant and the one or more additional grants having a same value. In some examples of the method, apparatuses, and non-transitory computer-readable medium described herein, each of the grant and the one or more additional grants includes a random access preamble identifier for transmitting the RRC connection request message, one or more of the random access preamble identifiers of the grant and the one or more additional grants having different values.

In some examples of the method, apparatuses, and non-transitory computer-readable medium described herein, each of the grant and the one or more additional grants includes a temporary cell identifier for transmitting the RRC connection request message, each of the temporary cell identifiers of each of the grant and the one or more additional grants having a same value. In some examples of the method, apparatuses, and non-transitory computer-readable medium described herein, each of the grant and the one or more additional grants includes a temporary cell identifier for transmitting the RRC connection request message, one or more of the temporary cell identifiers of the grant and the one or more additional grants having different values.

Some examples of the method, apparatuses, and non-transitory computer-readable medium described herein may further include operations, features, means, or instructions for receiving timing information from the base station, the timing information indicating a time-domain offset between the random access response message, the one or more of the first set of uplink resources, the second set of uplink resources, or a combination thereof, and transmitting the RRC connection request message according to the timing information.

Some examples of the method, apparatuses, and non-transitory computer-readable medium described herein may further include operations, features, means, or instructions for transmitting the RRC connection request message using whichever of the first set of uplink resources or the second set of uplink resources may have an earliest time component.

Some examples of the method, apparatuses, and non-transitory computer-readable medium described herein may further include operations, features, means, or instructions for performing a channel access procedure for both the first set of uplink resources and the second set of uplink resources, and transmitting the RRC connection request message using whichever of the first set of uplink resources or the second set of uplink resources corresponds to a first successful channel access procedure.

In some examples of the method, apparatuses, and non-transitory computer-readable medium described herein, each of the grant and the one or more additional grants includes respective channel access procedure parameters for the first set of uplink resources or the second set of uplink resources, and transmitting the RRC connection request message to the base station may be based on a successful result of one or more of the channel access procedures according to the respective channel access procedure parameters. In some examples of the method, apparatuses, and non-transitory computer-readable medium described herein, the channel access procedure parameters include a channel access priority, channel occupancy time (COT) information, or a combination thereof, associated with the corresponding first set of uplink resources or second set of uplink resources.

Some examples of the method, apparatuses, and non-transitory computer-readable medium described herein may further include operations, features, means, or instructions for determining a signal strength associated with each of the first set of uplink resources and the second set of uplink resources, and transmitting the RRC connection request message using whichever of the first set of uplink resources or the second set of uplink resources may be associated with a greatest signal strength (e.g., the base station and UE may map each preamble of one or more random access request messages to a corresponding synchronization signal block (SSB) index or group of SSB indexes, and an index of the preambles may map to corresponding random access preamble identifiers (RAPIDs), such that the base station and/or the UE may use the RAPIDs to identify particular beams or sets of beams with a greatest signal strength to be used to transmit the RRC connection request message).

In some examples of the method, apparatuses, and non-transitory computer-readable medium described herein, the random access response message indicates beam information associated with the grant for the first set of uplink resources, and beam parameters for an uplink beam to be used to transmit the RRC connection request message may be based on the beam information. Some examples of the method, apparatuses, and non-transitory computer-readable medium described herein may further include operations, features, means, or instructions for determining the uplink beam to be used to transmit the RRC connection request message to the base station based on the beam parameters for the uplink beam, and transmitting the RRC connection request message to the base station using the uplink beam.

In some examples of the method, apparatuses, and non-transitory computer-readable medium described herein, the beam information indicates a mapping of one or more beam indexes according to one or more corresponding random access preamble identifiers. In some examples of the method, apparatuses, and non-transitory computer-readable medium described herein, the beam information indicates one or more downlink beam parameters for a downlink beam used to receive synchronization signals from the base station, and determining the uplink beam to be used to transmit the RRC connection request message may be based on a correspondence between the downlink beam parameters and the uplink beam parameters for the uplink beam. In some examples of the method, apparatuses, and non-transitory computer-readable medium described herein, the downlink beam used to receive the synchronization signals from the base station may be different than a second downlink beam used to receive the random access response message from the base station.

A method of wireless communications at a base station is described. The method may include receiving a random access request message from a UE, transmitting a random access response message to the UE in response to the random access request message, the random access response message including a grant for a first set of uplink resources for receiving an RRC connection request message from the UE, receiving the RRC connection request message from the UE using one or more of the first set of uplink resources or a second set of uplink resources, the second set of uplink resources based on the grant for the first set of uplink resources, and establishing a connection with the UE based on the RRC connection request message.

An apparatus for wireless communications at a base station is described. The apparatus may include a processor, memory in electronic communication with the processor, and instructions stored in the memory. The instructions may be executable by the processor to cause the apparatus to receive a random access request message from a UE, transmit a random access response message to the UE in response to the random access request message, the random access response message including a grant for a first set of uplink resources for receiving an RRC connection request message from the UE, receive the RRC connection request message from the UE using one or more of the first set of uplink resources or a second set of uplink resources, the second set of uplink resources based on the grant for the first set of uplink resources, and establish a connection with the UE based on the RRC connection request message.

Another apparatus for wireless communications at a base station is described. The apparatus may include means for receiving a random access request message from a UE, transmitting a random access response message to the UE in response to the random access request message, the random access response message including a grant for a first set of uplink resources for receiving an RRC connection request message from the UE, receiving the RRC connection request message from the UE using one or more of the first set of uplink resources or a second set of uplink resources, the second set of uplink resources based on the grant for the first set of uplink resources, and establishing a connection with the UE based on the RRC connection request message.

A non-transitory computer-readable medium storing code for wireless communications at a base station is described. The code may include instructions executable by a processor to receive a random access request message from a UE, transmit a random access response message to the UE in response to the random access request message, the random access response message including a grant for a first set of uplink resources for receiving an RRC connection request message from the UE, receive the RRC connection request message from the UE using one or more of the first set of uplink resources or a second set of uplink resources, the second set of uplink resources based on the grant for the first set of uplink resources, and establish a connection with the UE based on the RRC connection request message.

Some examples of the method, apparatuses, and non-transitory computer-readable medium described herein may further include operations, features, means, or instructions for receiving a repeated transmission of the RRC connection request message from the UE using one or more of the first set of uplink resources or the second set of uplink resources. In some examples of the method, apparatuses, and non-transitory computer-readable medium described herein, the repeated transmission of the RRC connection request message to the base station may be based on grant multiplicity information included in the random access response message.

In some examples of the method, apparatuses, and non-transitory computer-readable medium described herein, the random access response message includes one or more additional grants for the first set of uplink resources, and the second set of uplink resources may be based on the one or more additional grants for the first set of uplink resources. In some examples of the method, apparatuses, and non-transitory computer-readable medium described herein, each of the grant and the one or more additional grants includes a random access preamble identifier for transmitting the RRC connection request message, each of the random access preamble identifiers of each of the grant and the one or more additional grants having a same value.

In some examples of the method, apparatuses, and non-transitory computer-readable medium described herein, each of the grant and the one or more additional grants includes a random access preamble identifier for transmitting the RRC connection request message, one or more of the random access preamble identifiers of the grant and the one or more additional grants having different values. In some examples of the method, apparatuses, and non-transitory computer-readable medium described herein, each of the grant and the one or more additional grants includes a temporary cell identifier for transmitting the RRC connection request message, each of the temporary cell identifiers of each of the grant and the one or more additional grants having a same value. In some examples of the method, apparatuses, and non-transitory computer-readable medium described herein, each of the grant and the one or more additional grants includes a temporary cell identifier for transmitting the RRC connection request message, one or more of the temporary cell identifiers of the grant and the one or more additional grants having different values.

Some examples of the method, apparatuses, and non-transitory computer-readable medium described herein may further include operations, features, means, or instructions for transmitting timing information to the UE, the timing information indicating a time-domain offset between the random access response message, the one or more of the first set of uplink resources, the second set of uplink resources, or a combination thereof, and receiving the RRC connection request message according to the timing information.

Some examples of the method, apparatuses, and non-transitory computer-readable medium described herein may further include operations, features, means, or instructions for receiving the RRC connection request message using whichever of the first set of uplink resources or the second set of uplink resources may have an earliest time component. Some examples of the method, apparatuses, and non-transitory computer-readable medium described herein may further include operations, features, means, or instructions for receiving the RRC connection request message using whichever of the first set of uplink resources or the second set of uplink resources corresponds to a first successful channel access procedure.

In some examples of the method, apparatuses, and non-transitory computer-readable medium described herein, each of the grant and the one or more additional grants includes respective channel access procedure parameters for the first set of uplink resources or the second set of uplink resources, and receiving the RRC connection request message from the UE may be based on a successful result of one or more of the channel access procedures according to the respective channel access procedure parameters. In some examples of the method, apparatuses, and non-transitory computer-readable medium described herein, the channel access procedure parameters include a channel access priority, COT information, or a combination thereof, associated with the corresponding first set of uplink resources or second set of uplink resources.

Some examples of the method, apparatuses, and non-transitory computer-readable medium described herein may further include operations, features, means, or instructions for receiving the RRC connection request message using whichever of the first set of uplink resources or the second set of uplink resources may be associated with a greatest signal strength.

Some examples of the method, apparatuses, and non-transitory computer-readable medium described herein may further include operations, features, means, or instructions for identifying beam information associated with the grant for the first set of uplink resources, where the random access response message indicates the beam information, and beam parameters for an uplink beam used to receive the RRC connection request message may be based on the beam information. Some examples of the method, apparatuses, and non-transitory computer-readable medium described herein may further include operations, features, means, or instructions for receiving the RRC connection request message from the UE using the uplink beam according to the beam parameters. In some examples of the method, apparatuses, and non-transitory computer-readable medium described herein, the beam information indicates a mapping of one or more beam indexes according to one or more corresponding random access preamble identifiers.

In some examples of the method, apparatuses, and non-transitory computer-readable medium described herein, the beam information indicates one or more downlink beam parameters for a downlink beam used to transmit synchronization signals to the UE, and the uplink beam used to receive the RRC connection request message may be based on a correspondence between the downlink beam parameters and the uplink beam parameters for the uplink beam. In some examples of the method, apparatuses, and non-transitory computer-readable medium described herein, the downlink beam used to transmit the synchronization signals to the UE may be different than a second downlink beam used to transmit the random access response message to the UE.

DETAILED DESCRIPTION

Figure 1:
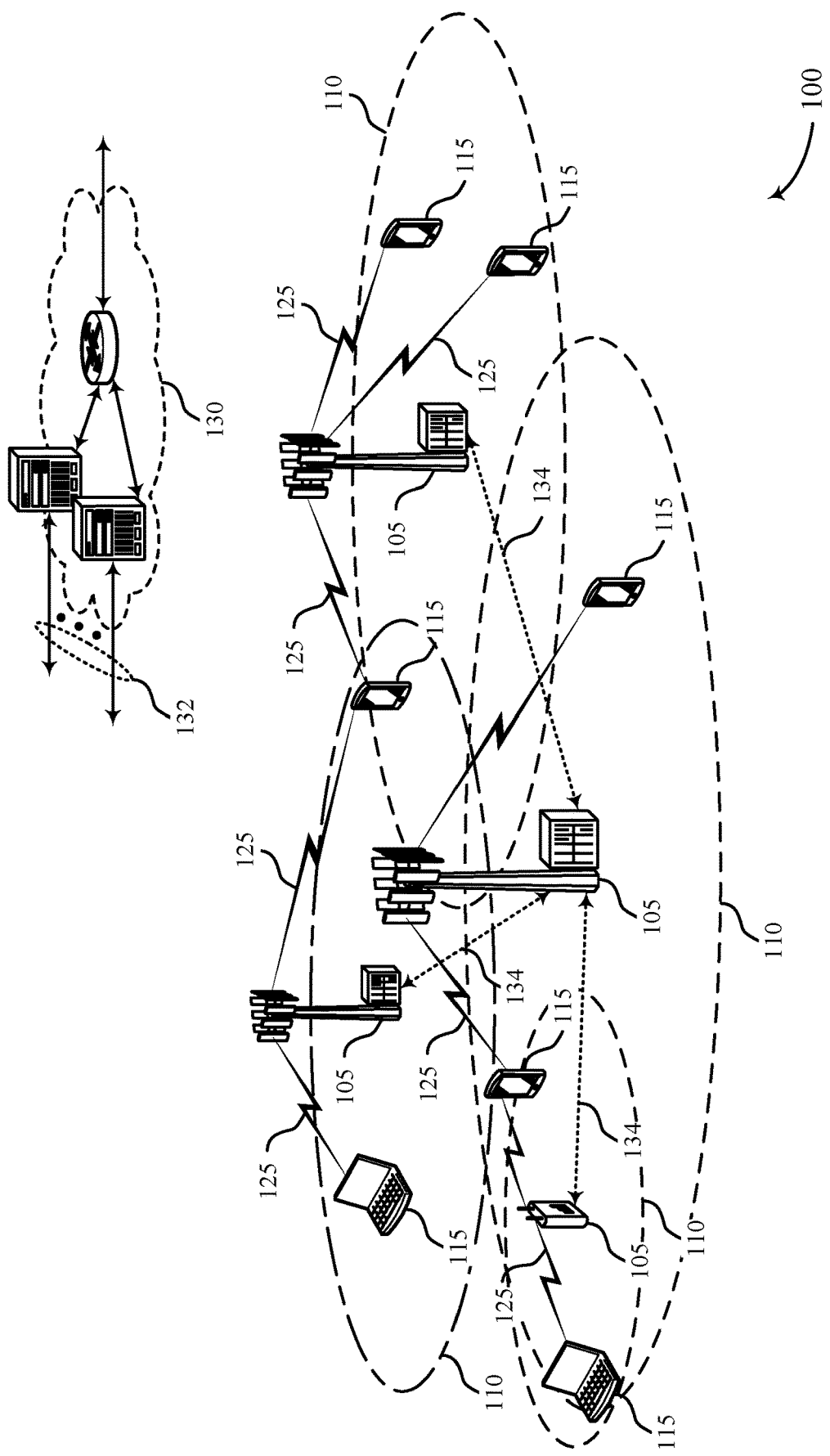
FIG. 1 illustrates an example of a system for wireless communications system that supports techniques for using multiple sets of uplink resources in a random access procedure in accordance with aspects of the present disclosure.

The present disclosure describes techniques for using multiple sets of uplink resources to avoid collisions during a random access procedure. A user equipment (UE) may perform a random access procedure (e.g., a random access channel (RACH) procedure) with a base station to access a wireless network, for example, when initially accessing the wireless network or during a handover. The random access procedure may, for example, include a random access request message, a random access response message, a radio resource control (RRC) message such as an RRC connection request message, and/or a contention resolution message. In some cases, these messages may include, or be referred to as, a RACH Msg 1, a RACH Msg2, a RACH Msg3, and a RACH Msg4, respectively. Each of the messages of the random access procedure may be communicated using corresponding sets of resources (e.g., corresponding sets of time, frequency, and/or spatial resources).

According to the random access procedure, the UE may first transmit a random access request message to the base station using a set of resources (e.g., a set of RACH resources). The random access request message may be, for example, a physical random access channel (PRACH) transmission transmitted using a set of resources allocated for PRACH transmissions. In some cases, the random access request message may, for example, include a random access preamble that identifies the random access request message corresponding to the UE.

The base station may receive the random access request message and may, for example, identify that the random access preamble corresponds to the transmitting UE (e.g., according to a random access preamble identifier (RAPID)). In response, the base station may transmit the random access response message to the UE, where the random access response message may include a grant for a first set of uplink resources (e.g., a set of time, frequency, and/or spatial resources) for transmitting the RRC connection request message to the base station. The UE may use the uplink grant to transmit a first scheduled uplink transmission to the base station (e.g., the RRC connection request message for the random access procedure). The RRC connection request message may, for example, indicate a configuration that the base station may use to establish a communication link with the UE, for example, including an RRC Connection Request message, an identifier of the UE, and like information. The base station and the UE may then communicate uplink and downlink transmission using the configured communication link.

In some cases, the UE and the base station may perform the random access procedure while operating in a shared or unlicensed radio frequency spectrum bandwidth. In some cases, other communications devices (e.g., other UEs, base stations, etc.) in the relatively nearby vicinity may also send transmissions using resources of the shared radio frequency spectrum bandwidth (the resources, e.g., at least partially overlapping a set of resources to be used for the random access procedure). In such cases, communications to and/or from the other devices on overlapping time, frequency, and space resources of the shared radio frequency spectrum band may collide with the messages communicated between the UE and the base station for the random access procedure.

In some cases, if one message of the random access procedure is not correctly received, the random access procedure may fail (e.g., due to the deterministic relationship, and timings for, one message to the next in the random access procedure). For example, if the RRC connection request message collides with another transmission from another device in the vicinity of the UE or the base station (the other device transmitting using the same or an overlapping set of resources), the base station may not correctly receive the random access response message including the grant for the first set of uplink resources on which to transmit the RRC connection request message to the base station. In this case, the random access procedure fails, and the UE and the base station may restart a new random access procedure, for example, from the first message (e.g., via a new random access request message). In this way, for example, one message collision may cause a failure to successfully complete a random access procedure including one uplink grant in the random access response message, which may result in inefficient resource utilization and/or communications delays (e.g., a delay in obtaining access to a network).

In some cases, before establishing a connection for communications on the shared radio frequency spectrum band, the UE and/or the base station may utilize a channel access procedure (e.g., an LBT procedure) to determine whether the time and frequency resources for the channel are available, which may prevent interference and collisions with nearby communications between another UE and the base station, another UE and another base station, higher priority transmissions (e.g., radar), etc. For example, before one or more of the messages of the random access procedure, the UE and/or the base station may perform an opportunistic contention-based channel access procedure (e.g., a listen-before-talk (LBT) procedure) to contend for access to the shared radio frequency spectrum band. In some cases, the UE may perform a directional LBT procedure in multiple transmission direction, for example, in a communications system that supports relatively more directional communications (e.g., millimeter wave (mmW) communications systems).

Moreover, in some cases, the random access procedure may fail when the UE does not successfully perform an LBT procedure, for example, before transmitting the RRC connection request message. That is the UE may determine via the LBT procedure that the medium is not available to transmit according to the allocated resources, and thus may not transmit the RRC connection request message to the base station. The base station may not correctly receive RRC connection request message based on which a connection would be established with the UE. In this case, the random access procedure fails, and the UE and the base station may restart a new random access procedure, for example, from the first message (e.g., via a new random access request message). In this way, for example, a failure to successfully complete the LBT procedure for one uplink grant including one uplink grant may similarly cause inefficient resource utilization and/or communications delays (e.g., a delay in obtaining access to a network).

According to the techniques described herein, the UE and the base station may utilize multiple sets of uplink resources to mitigate the effects of and/or prevent such a failed LBT procedure. In some cases, the base station may convey multiple uplink grants to the UE so that if the medium is busy during the resources of a first uplink grant, the UE may transmit the RRC connection request message using resources of one or more additional uplink grants. For example, the base station may indicate multiple sets of uplink resources in a payload of a single random access response message. Additionally or alternatively, the base station may configure each of multiple uplink grants separately in separate random access response message payloads.

Additionally or alternatively, in some cases, the base station may indicate a grant for one set of uplink resources in the random access response message and the UE may derive further grants implicitly from the indicated grant. When the UE identifies multiple sets of resources to be used for transmitting the RRC connection request message (e.g., according to multiple uplink grants), the UE may transmit one or more RRC connection request messages using the resources allocated by more than one of the uplink grants (e.g., using the resources of each of the uplink grants or as implicitly derived at the UE). Accordingly, the described techniques provide for flexible scheduling of uplink grants such that the base station may be able to more dynamically account for network conditions.

Further, for directional communications using different directional transmit beams, the base station may include beam information in the random access response message indicating one or more beams to be used for transmitting the RRC connection request message. In some cases, the UE may identify one or more uplink beams to be used to transmit the RRC connection request message according to a beam correspondence based on the random access response message (e.g., a known correspondence between uplink and downlink beams). For example, the base station and UE may map each preamble of one or more random access request messages to a corresponding synchronization signal block (SSB) index or group of SSB indexes, and an index of the preambles may map to corresponding RAPIDs, such that the base station and/or the UE may use the RAPIDs to identify particular beams or sets of beams with particular beam parameters to be used to transmit the RRC connection request message. In this way, the base station may identify for the UE a particular beam via its corresponding RAPID even though the UE did not transmit the random access request message using the corresponding RAPID.

In some cases, the UE use determine a signal strength associated with each beams indicated via the corresponding RAPIDs, and the UE may determine to transmit one or more RRC connection request messages using a transmit beam for which the UE determined to have a strongest signal strength (or multiple transmit beams with the strongest signal strengths). In some such cases where the UE determines uplink resources having the greatest signal strength for the respective beams from each of the uplink resources, the UE may use the RAPIDs or SSB indexes to identify the SSBs from which to select the resources (or beam) having the strongest signal strength. The UE may then select the uplink resources via the beam correspondence with the SSB that has the strongest signal strength.

Aspects of the disclosure are initially described in the context of a wireless communications system. Aspects of the disclosure are also described in the context of message formats and a process flow that relate to configuring uplink control channel resources for communications in a shared radio frequency spectrum. Aspects of the disclosure are further illustrated by and described with reference to apparatus diagrams, system diagrams, and flowcharts that relate to techniques for using multiple sets of uplink resources in a random access procedure.

FIG. 1 illustrates an example of a wireless communications system 100 that supports techniques for using multiple sets of uplink resources in a random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunications system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may perform a random access procedure with a network access device (e.g., a base station 105). A UE 115 may perform a random access procedure with a base station 105 of the wireless communications system 100, for example, when initially accessing the wireless network from an idle state (e.g., when performing initial access from an RRC_IDLE state), or when performing an RRC Connection Re-establishment procedure, or in conjunction with a handover procedure. Additionally or alternatively, the UE 115 may perform a random access procedure with the base station 105 upon downlink data arrival when in an RRC_CONNECTED state (e.g., when uplink synchronization is "non-synchronized"), or upon uplink data arrival when in an RRC_CONNECTED state (e.g., when uplink synchronization is "non-synchronized," or when no physical uplink control channel (PUCCH) resources are available for transmitting a SR). Further additionally or alternatively, the UE 115 may perform a random access procedure with the base station 105 for a positioning purpose when in an RRC_CONNECTED state (e.g., when a timing advance is needed for UE positioning). In some cases, the UE 115 may perform a random access procedure with the base station 105 in a CA or dual-connectivity scenario.

Random access procedures may be contention-based or non-contention-based. Contention-based random access procedures may, for example, include random access procedures performed when initially accessing a communications network from an idle state. Non-contention-based random access procedures may include, for example, random access procedures performed in conjunction with a handover procedure.

According to the techniques described herein, a UE 115 may transmit a random access request message preamble (e.g., to a base station 105) and receive a random access response message (e.g., from the base station 105) that indicates multiple uplink grants associated with the random access request message. Each of the uplink grants may be associated with different transmission resources (e.g., different sets of time, frequency, and/or spatial resources), so that communications using the assigned resources of different uplink grants do not collide. The UE 115 may process the random access response message and, for example, select an uplink grant from the plurality of uplink grants to transmit a configuration message (e.g., the RRC connection request message, or Msg3) to the base station 105 using the corresponding resources.

As similarly described herein, one message of the random access procedure that is not communicated successfully due to a collision may cause the random access procedure to fail. For example, if a first random access procedure fails due to a collision with an RRC connection request message (e.g., allocated to be transmitted according to a single uplink grant), or an LBT procedure indicates that the resources allocated for the RRC connection request message are not available, the UE 115 and the base station 105 may then perform a second random access procedure after having used power and transmission resources to successfully communicate the first random access request message and the first random access response message, as well as the failed RRC connection request message. Further, while the second random access procedure is then performed successfully, the UE 115 will incur a time delay before successfully obtaining access to the wireless network.

If, however, multiple uplink grants are configured to allocate multiple sets of resources for the RRC connection request message (e.g., according to multiple grants received from the base station 105 and/or as implicitly derived at the UE 115), the UE 115 may additionally or alternatively transmit the RRC connection request message using a set of resources that would avoid and/or mitigate such a collision. For example, according to grant multiplicity information signaled to the UE 115 in the random access response message, the UE 115 may transmit multiple repetitions of the RRC connection request message to the base station 105. Thus, even if a first transmitted RRC connection request message collides with another communication, it is relatively probable that the base station 105 may successfully receive at least one of the RRC connection request messages, thus conserving power and subsequent transmission resources (e.g., in time, frequency, and/or space), for example, as compared to starting a second channel access procedure upon the failed communication of one RRC connection request message. Similarly, the UE 115 may not incur a delay (e.g., as may have been incurred to perform a second channel access procedure) before obtaining access to the wireless network and communicating with the base station 105.

Additionally or alternatively, according to the techniques described herein, the UE 115 may perform one or more channel access procedures (e.g., LBT procedures) for each set of resources allocated for the RRC connection request messages. In this case, one LBT procedure may indicate that one set of resources is not available (e.g., on which the RRC connection request message may encounter a collision), and the UE 115 may transmit one or more RRC connection request messages using one or more of the sets of resources for which the UE 115 may have performed a successful LBT procedure indicating that the corresponding resources are available. Accordingly, the UE 115 may avoid a potential collision and successfully communicate the RRC connection request message to the base station 105, which may allow the UE 115 to conserve power and subsequent transmission resources. The UE 115 may also avoid an additional delay that may have been incurred to perform a second channel access procedure to obtain access to the wireless network, thus, in some cases, facilitating relatively faster access to the wireless network after beginning the first channel access procedure.

Figure 2:
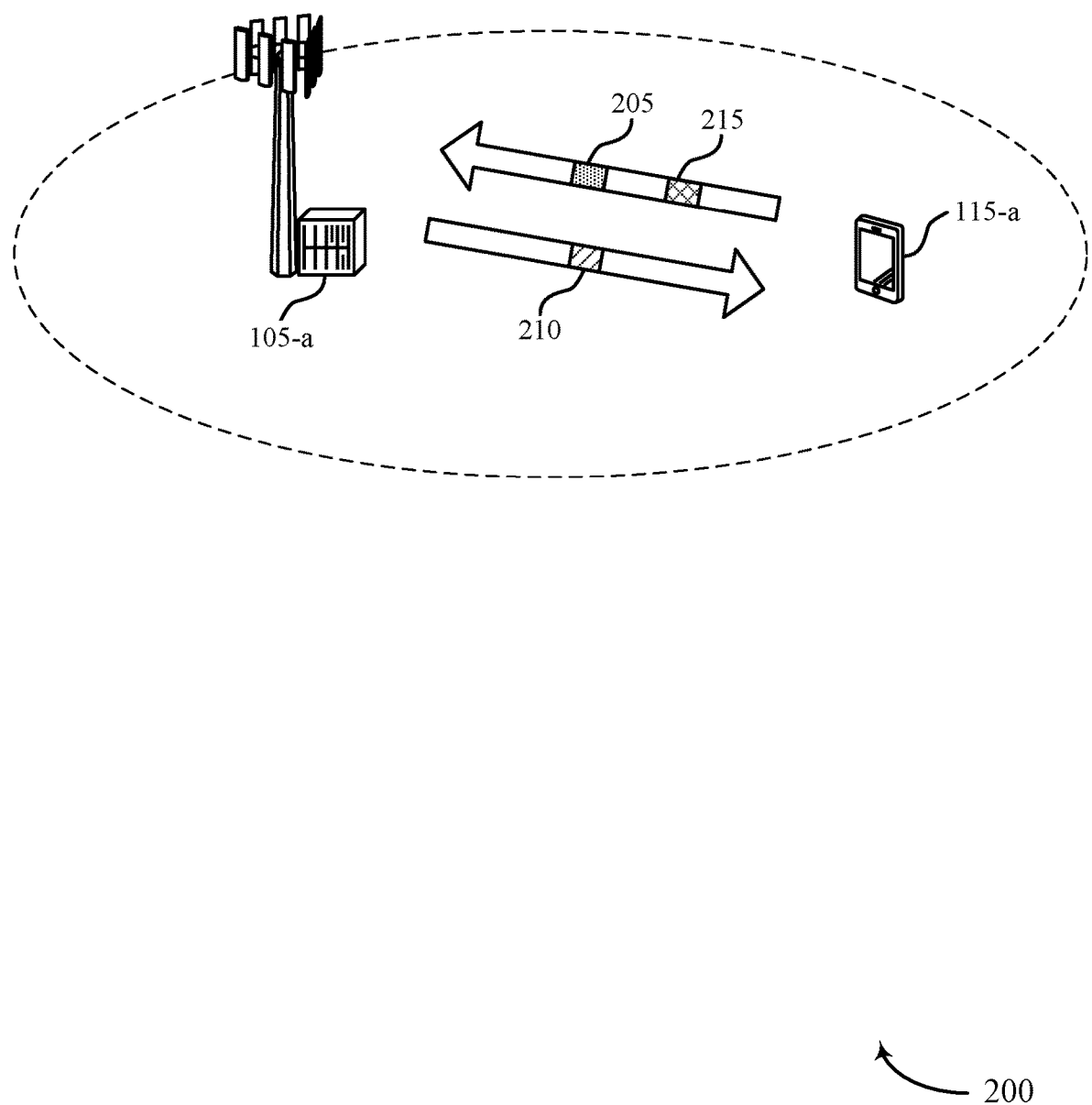
FIG. 2 illustrates an example of a wireless communications system that supports techniques for using multiple sets of uplink resources in a random access procedure in accordance with aspects of the present disclosure.

FIG. 2 illustrates an example of a wireless communications system 200 that supports techniques for using multiple sets of uplink resources in a random access procedure in accordance with aspects of the present disclosure. In some examples, the wireless communications system 200 may implement aspects of the wireless communications system 100 as described with reference to FIG. 1. The wireless communications system 200 includes a base station 105-a and a UE 115-a, which may be examples of the corresponding devices as described with reference to FIG. 1.

In some such cases, the UE 115-a and the base station 105-a may perform a random access procedure to establish a connection to be used to communicate uplink and downlink data transmissions. The random access procedure may include the UE 115-a transmitting to the base station 105-a a first message (e.g., Msg1), for example, a random access request message 205. In response, the base station 105-a may transmit to the UE 115-a a second message (e.g., Msg2), for example, a random access response message 210. The UE 115-a may then transmit to the base station 105-a a third message (e.g., Msg3), for example, an RRC message referred to as an RRC connection request message 215, requesting a new or reconfigured connection with the base station 105-a (e.g., an RRC connection request message). In some cases, the random access procedure may include the base station 105-a transmitting to the UE 115-a a fourth message (e.g., Msg4) including, for example, a contention resolution message, or other downlink signaling, such as an RRC connection request message to confirm the requested new or reconfigured connection. After successfully performing the random access procedure, the UE 115-a and the base station 105-a may establish a data connection for subsequent transmissions of data and other communications.

In some cases, as contemplated herein, the UE 115-a and the base station 105-a may operate in a shared or unlicensed radio frequency spectrum bandwidth. In some such cases, before establishing and initiating communications, the UE 115-a and/or the base station 105-a may utilize a channel access procedure to determine whether the time and frequency resources for the channel are available, which may prevent interference and collisions with communications between another UE 115 and the base station 105-a, another UE 115 and another base station 105, higher priority transmissions (e.g., radar), etc. For example, before one or more (e.g., each) of the messages of the random access procedure, the UE 115-a and/or the base station 105-a may perform an opportunistic contention-based channel access procedure (e.g., a LBT procedure, such as a CAT4, CAT2, or CAT1 LBT procedure, etc.) to contend for access to the transmission medium or channel. In some cases, the UE 115-*a* may perform a directional LBT procedure in multiple transmission direction, for example, for communications systems using relatively more directional communications (e.g., mmW communications systems).

For example, at the beginning of a random access procedure, the UE 115-*a* may perform an LBT procedure to ascertain that a set of resources is available for transmission (e.g., time, frequency, and/or spatial resources allocated for PRACH transmissions). If the LBT procedure is successful, the UE 115-*a* may transmit the first message of a random access procedure including the random access request message 205 to the base station 105-*a*. The random access request message 205 may be, for example, a PRACH transmission transmitted using a set of resources allocated for PRACH transmissions. In some cases, the random access request message 205 may include a preamble, for example, selected from a set of preamble sequences, such as a set of a number (e.g., 64) of preamble sequences associated with a cell. The UE 115-*a* may identify the plurality of preamble sequences from system information (SI), for example, broadcasted by the base station 105-*a*.

If the base station 105-*a* successfully receives the random access request message 205, the base station 105-*a* may perform an LBT procedure for transmitting the second message of the random access procedure to the UE 115-*a*. If the LBT procedure is successful, the base station 105-*a* may transmit the random access response message 210 to the UE 115-*a* using, for example, a physical downlink control channel (PDCCH) and a payload in a physical downlink shared channel (PDSCH). For example, the base station 105-*a* may transmit control information using the PDCCH, and the PDSCH payload may include the random access response message 210. In some cases, the random access response message 210 may be transmitted on the PDSCH with a random access radio network temporary identifier (RA-RNTI) as a physical identifier. If the base station 105-*a* does not detect the random access preamble, or the LBT procedure is unsuccessful, the base station 105-*a* may not transmit the random access response message 210.

The random access response message 210 may include, for example, an index corresponding to the detected random access preamble of the UE 115-*a* (e.g., an index of a detected preamble sequence, such as a RAPID), an uplink grant (e.g., a grant of time, frequency, and/or spatial resources using a physical uplink shared channel (PUSCH), a temporary cell RNTI (TC-RNTI), and other information, such as an indication of a timing advance (e.g., a timing advance group (TAG)), etc. In the time domain, the uplink grant may indicate, for example, a slot offset, a starting symbol and a length of symbols, and the like. In some examples, the base station 105-*a* may include uplink grants in a single payload (e.g., indications of uplink grants in multiple random access response messages 210 corresponding to different random access preambles received from different UEs 115).

The UE 115-*a* may receive the random access response message 210 and may then determine whether the random access response message 210 contains information intended for the UE 115-*a* (e.g., rather than information for other UEs 115 performing other respective random access procedures). For example, the UE 115-*a* may monitor a search space (e.g., a Type-1-Common-PDCCH search space) for the RA-RNTI corresponding to its transmitted random access request message 205. In the payload, the UE 115-*a* may look for a RAPID similarly corresponding to its transmitted random access request message 205.

If the UE 115-*a* successfully receives the random access response message 210, the UE 115-*a* may perform a further LBT procedure for transmitting the third message of the random access procedure to the base station 105-*a*. If the LBT procedure is successful, the UE 115-*a* may transmit a first scheduled uplink transmission (e.g., the RRC connection request message 215) using the transmission resources associated with an uplink grant included in the random access response message 210 intended for the UE 115-*a*. The RRC connection request message 215 may indicate a configuration for establishing a communication link, for example, including an RRC Connection Request message and an identifier of the UE 115-*a* (i.e., a UE-specific identifier). The RRC connection request message 215 may provide a configuration to then establish a communication link between the UE 115-*a* and the base station 105-*a*. The UE 115-*a* may scramble the RRC connection request message 215 with the TC-RNTI as the base station 105-*a* may have signaled in the random access response message 210 intended for the UE 115-*a*.

In some cases, in response to decoding the RRC connection request message 215, the base station 105-*a* may further transmit a fourth message of the random access procedure to the UE 115-*a*, for example, a contention resolution message. In some cases, the base station 105-*a* may perform a further LBT procedure for the fourth message. In some examples, the contention resolution message may be transmitted on the PDSCH, and may be scrambled using the same TC-RNTI used to scramble the RRC connection request message 215. In some case, the contention resolution message may include, for example, the UE identifier received in the RRC connection request message 215 and/or other information for contention resolution. Following the successful performance of the random access procedure, the UE 115-*a* and the base station 105-*a* may establish a communication link to communicate uplink and/or downlink transmissions, for example, based on the RRC connection request message 215 (e.g., according to an RRC configuration signaled in the RRC connection request message 215). In some cases, the base station 105-*a* and the UE 115-*a* may establish the communication link without communicating the contention resolution message—that is, the UE 115-*a* and the base station 105-*a* may successfully complete the random access procedure and establish the communication link when the base station 105-*b* receives the RRC connection request message 215.

In some cases, a failed result of an LBT procedure at any stage of the random access procedure may dictate that the UE 115-*a* and the base station 105-*a* restart from the beginning of a new random access procedure. In such cases, due to the timing of the messages of the random access procedure, some resources may end up being unused. Additionally, in cases of directional LBT, LBT rules may indicate that transmissions are blocked in certain beam directions, but transmissions would be permitted in other beam directions. If, for example, the UE 115-*a* does not transmit the RRC connection request message 215 due to a failed LBT procedure during the random access procedure, the resources allocated for the RRC connection request message 215 may go unused, thus leading to inefficiencies in resource utilization.

The UE 115-*a* and the base station 105-*a* may utilize multiple sets of uplink resources to mitigate the effects of and/or prevent such a failed LBT procedure. In some cases, the base station 105-*a* may convey multiple uplink grants to the UE 115-*a* so that if the medium is busy during the resources of a first uplink grant, the UE 115-*a* may transmit the RRC connection request message 215 using resources of one or more additional uplink grants. For example, the base station 105-*a* may indicate multiple sets of uplink resources in a payload of a single random access response message 210. Additionally or alternatively, the base station 105-*a* may configure each of multiple uplink grants separately in separate random access response message payloads. As further described with reference to FIGS. 3 and 4, one or more random access response message payloads may, for example, include a common TC-RNTI for one or more of the grants, a common RAPID for one or more of the grants, and/or multiple different RAPIDs between one or more of the grants (e.g., for multi-beam grants in directional communications). Additionally or alternatively, as further described with reference to FIG. 5, the base station 105-*a* may indicate a grant for one set of uplink resources in the random access response message 210, and the UE 115-*a* may derive further grants implicitly from the first uplink grant.

When the UE 115-*a* identifies multiple sets of resources to be used for transmitting the RRC connection request message 215 (e.g., according to multiple uplink grants), the UE 115-*a* may, in some cases, transmit the RRC connection request message 215 using the resources allocated by more than one of the uplink grants (e.g., using the resources of each of the uplink grants). Alternatively, the UE 115-*a* may transmit the RRC connection request message 215 using the resources allocated by only one of the uplink grants. For example, the UE 115-*a* may use the grant corresponding to the earliest time resources, a first of the uplink grants for which the UE 115-*a* successfully performs an LBT procedure, and/or, when beam indications are present for directional communications, using a strongest downlink SSB of the SSBs indicated via the RAPIDs and/or via SSB indexes.

That is, for directional communications using different directional transmit beams, the UE 115-*a* may receive beam information in the random access response message 210 indicating one or more beams to be used for transmitting the RRC connection request message 215. The UE 115-*a* may identify one or more uplink beams to be used to transmit the RRC connection request message 215 according to a beam correspondence based on the random access response message 210 (e.g., a known correspondence between uplink and downlink beams). For example, the UE 115-*a* may identify a particular beam according to the beam indexes corresponding to indicated RAPIDs). For example, the UE 115-*a* may identify a particular beam with particular beam parameters (e.g., a direction, etc.) to be used to transmit the RRC connection request message 215. In some cases, the UE 115-*a* may perform a directional LBT procedure according to a beam correspondence (i.e., a correspondence between particular uplink and downlink, or transmit and receive, beams), and the directional LBT procedure may accordingly indicate that the medium is available in some directions but busy in other directions. In some cases, the UE 115-*a* may derive beam indexes according to the uplink grant to be used to transmit the RRC connection request message 215 and/or to perform an LBT procedure where the derived beam index does not correspond to a beam that the UE 115-*a* used to transmit the random access request message 205.

For directional communications using one or more directional transmit and/or receive beams, the base station 105-*a* may include beam information in the random access response message 210 indicating one or more beams to be used for transmitting the RRC connection request message 215. For example, as further described with reference to FIGS. 6 and 7, the base station 105-*a* may indicate one or more SSBs to be used for transmitting the RRC connection request message 215 according to one or more SSB indexes (e.g., by includes an explicit SSB index (SSBIdx) and/or channel state information (CSI) reference signal (CSI-RS) index (CSIRSidx) in the random access response message payload), one or more RAPIDs, and the like. As such, the UE 115-*a* and the base station 105-*a* may map each preamble of one or more random access request messages 205 to a corresponding SSB index or group of SSB indexes, and an index of the preambles may map to corresponding RAPIDs, such that the base station 105-*a* may use the RAPIDs to identify particular beams or sets of beams with particular beam parameters to be used to transmit the RRC connection request message 215. In this way, the base station 105-*a* may identify a particular beam via its corresponding RAPID even though the UE 115-*a* did not transmit the random access request message 205 using the corresponding RAPID. In some cases, the base station 105-*a* may signal multiple RAPIDs using one grant in a random access response message payload. Alternatively, the base station 105-*a* may signal multiple RAPIDs using multiple grants in a random access response message payload (e.g., using one RAPID per grant).

In some cases, the base station 105-*a* may include information in the random access response message 210 indicating one or more channel access procedure parameters. For example, the channel access procedure parameters may include a channel access priority parameter, a channel occupancy time (COT) parameter, and other information that the UE 115-*a* may use to perform subsequent LBT operations. For example, before transmitting the RRC connection request message 215 using one or more sets of resources (e.g., according to one or more corresponding uplink grants received from the base station 105-*a*), the UE 115-*a* may perform one or more LBT operations according to the channel access procedure parameters for each of the respective sets of resources. The UE 115-*a* may perform the LBT operations according to a channel access priority as signaled in the channel access procedure parameters and/or perform the LBT operations using a duration according to the COT parameter as signaled in the channel access procedure parameters. Additionally or alternatively, the UE 115-*a* may apply the channel access procedure parameters to a directional LBT operation to be performed before transmitting using one or more directional transmit beams.

In some cases, the UE 115-*a* may scale and/or time-shift the RRC connection request message 215 according to timing information included in the random access response message. For example, as similarly described herein, an uplink grant may indicate an offset given k2+$\Delta$, where k2 is a configurable slot offset parameter (e.g., a range of 4 values each separated by 1 slot), and $\Delta$ is an length of time to be applied as the offset. After receiving the random access response message 210 in a slot allocated for a PDSCH, the UE 115-*a* may wait for a duration of the offset before transmitting the RRC connection request message 215 in a slot allocated for PUSCH. When the base station 105-*a* signals multiple uplink grants and/or multiple sets of resources to be used to transmit the RRC connection request message 215, the offset (Offset(i)) may then be given by Offset(i)=k2*Scale(i)+$\Delta$, or Offset(i)=k2*Scale(i)+$\Delta$+$\beta$(i), where i is an index of the ith uplink grant, and Scale(i) and $\beta$(i) are scaling and time-shifting functions, respectively, parametrized according to the uplink grant index i. Such time offsets may separate the time resources according for each of the uplink grants, accordingly increasing LBT diversity at the UE 115-a (i.e., increased diversity between the different sets of resources for which the UE 115-a may perform LBT operations). This may, in some cases, relatively increase the probability that the UE 115-a successfully performs an LBT procedure according to the uplink grants.

Figure 3:
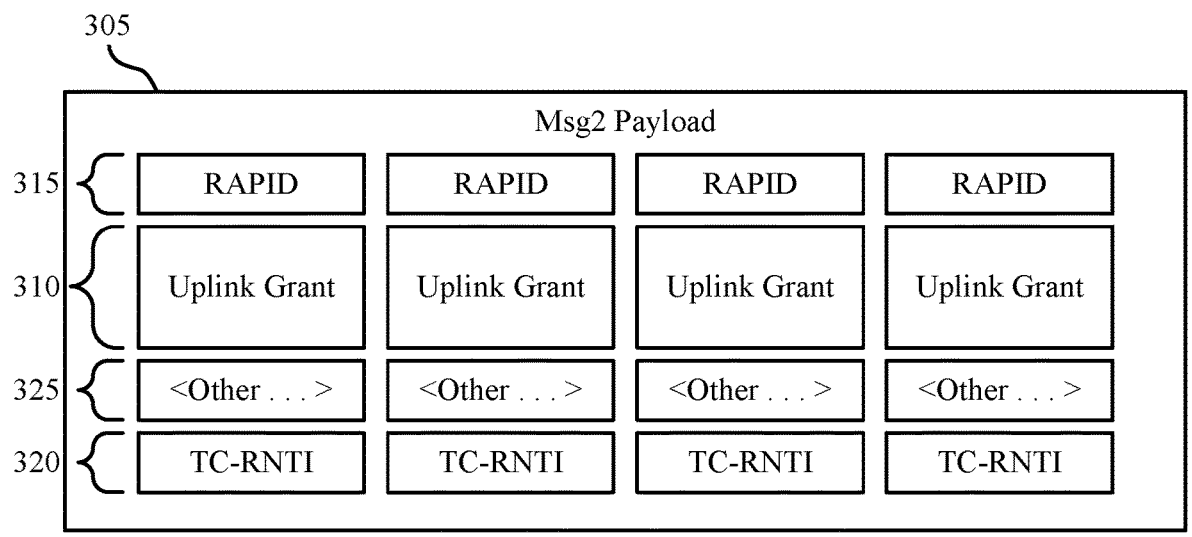
FIG. 3 illustrates an example of a message format for a communications scheme that supports techniques for using multiple sets of uplink resources in a random access procedure in accordance with aspects of the present disclosure.

FIG. 3 illustrates an example of a message format 300 for a communications scheme that supports techniques for using multiple sets of uplink resources in a random access procedure in accordance with aspects of the present disclosure. In some examples, the message format 300 may implement aspects of the wireless communications systems 100 and 200 as described with reference to FIGS. 1 and 2. The message format 300 illustrates a conceptual format for information that to be conveyed in a random access response message of a random access procedure between a base station and a UE. The message format 300 illustrates a random access response message format in which the base station separately configures one or more uplink grants 310 and other parameters.

The message format 300 shows the format of a payload 305 of a random access response message (e.g., in a Msg2 of the random access procedure), as a base station may transmit to a UE. The payload 305 includes fields for information bits for: multiple uplink grants 310 (e.g., four uplink grants 310 as shown in FIG. 3, or any other suitable number of uplink grants 310), multiple random access preamble identifiers (e.g., RAPIDs 315), multiple temporary cell identifiers (e.g., TC-RNTIs 320), and multiple fields for other information 325.

As similarly described with reference to FIG. 2, a UE and a base station may utilize multiple sets of uplink resources for the UE to transmit a configuration message (e.g., an RRC connection request message, for example, in a Msg3 of the random access procedure) to the base station. In some cases, the base station may convey multiple uplink grants to the UE, where each uplink grant indicates an allocated set of time, frequency, and/or spatial resources with which the UE may transmit an RRC connection request message. In some cases, the sets of resources indicated in each of the uplink grants 310 may be, for example, partially or completely non-overlapping. For example, the base station may indicate multiple sets of uplink resources in the payload 305 of the random access response message. Additionally or alternatively, the base station may configure each of multiple uplink grants separately in separate random access response message payloads 305, and the base station may transmit each payload 305 using, for example, a PDSCH.

Before transmitting the RRC connection request message, the UE may perform an LBT procedure for one or more of the corresponding sets of allocated resources indicated in the uplink grants 310. If the UE determines that the medium is busy during the resources of a first uplink grant 310 (e.g., according to a first LBT procedure), the UE may perform one or more further LBT procedures for the resources indicated by additional uplink grants 310. After successfully performing one or more LBT procedures for one or more of the allocated sets of resources, the UE may transmit the RRC connection request message on the set resources for which the UE successfully performed the corresponding LBT procedure.

In the example of FIG. 3, the base station may separately (i.e., independently) configure each uplink grant 310, identifiers, and other information. As shown in FIG. 3, the message format 300 shows a format for a random access response message including separate fields for separate and different uplink grants 310, separate fields for different RAPIDs 315, separate fields for different TC-RNTIs 320, and separate fields for other information 325. Each field may include one or more bits that signals the respective information. For example, each uplink grant 310 may include information bits that indicate a corresponding set of allocated uplink time, frequency, and/or spatial resources for transmitting the RRC connection request message.

In some cases, the base station may separately configure the one or more fields for one or more information bits for each of the RAPIDs 315 corresponding to respective ones of the uplink grants 310. The RAPIDs 315 may identify the UE as the UE for which the random access response message is intended via a corresponding preamble sequence and/or SSB that the UE may have used to transmit a random access request message (e.g., in a Msg1 of the random access procedure). The base station may similarly separately configure the one or more fields for one or more information bits for each of the TC-RNTIs 320 corresponding to respective ones of the uplink grants 310. The UE may subsequently use the signaled values for the TC-RNTIs 320 to scramble the RRC connection request message transmission. The base station may further similarly separately configure the one or more fields for one or more information bits for the other information 325 corresponding to respective ones of the uplink grants 310. The other information 325 may include timing information, LBT information, and/or the other information as described herein.

In some cases, each of the fields for each of the RAPIDs 315, TC-RNTIs 320, and other information 325 may carry the same information for each respective uplink grant 310 (i.e., each of the RAPIDs 315 indicating the same values corresponding to the same UE preamble sequence, etc.). Alternatively, the RAPIDs 315 may have different values corresponding to different preamble sequences, and/or the TC-RNTIs 320 may have different values for RRC connection request message transmissions using one or more of the different uplink grants 310, and/or the other information 325 may have different information corresponding to each of the respective uplink grants 310. The techniques described herein thus provide for flexible scheduling of the uplink grants 310 such that the base station may be able to more dynamically account for network conditions (e.g., due to varying collisions, interference, etc.).

Figure 4:
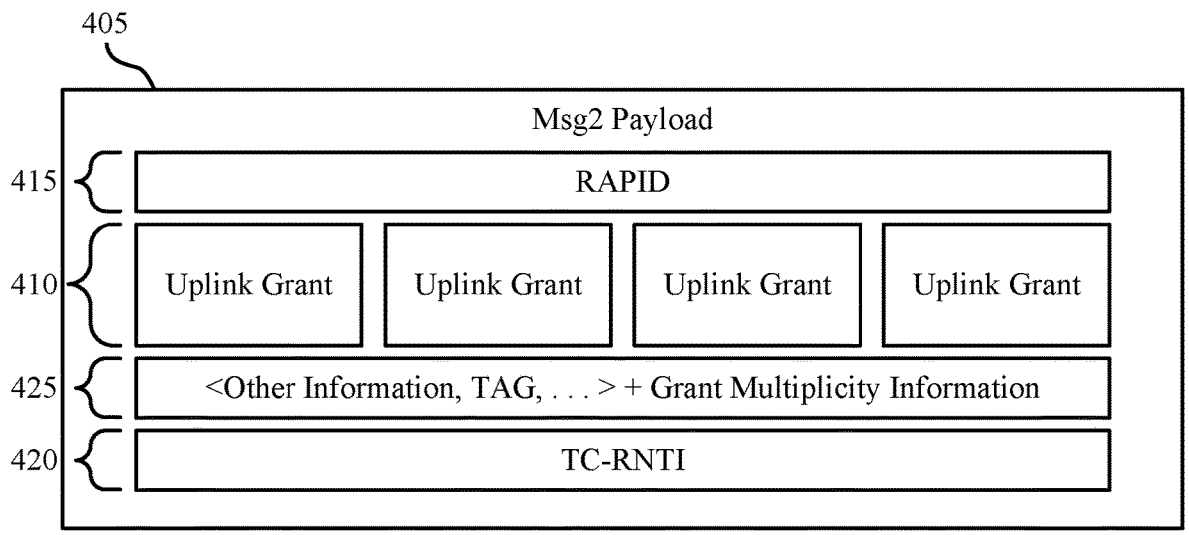
FIG. 4 illustrates an example of a message format for a communications scheme that supports techniques for using multiple sets of uplink resources in a random access procedure in accordance with aspects of the present disclosure.

FIG. 4 illustrates an example of a message format 400 for a communications scheme that supports techniques for using multiple sets of uplink resources in a random access procedure in accordance with aspects of the present disclosure. In some examples, the message format 400 may implement aspects of the wireless communications systems 100 and 200 as described with reference to FIGS. 1 and 2. The message format 400 may, in some cases, implement aspects of the message format 300 as described with reference to FIG. 3. The message format 400 illustrates a conceptual format for information to be conveyed in a random access response message of a random access procedure between a base station and a UE. The message format 400 illustrates a random access response message format in which the base station configures one or more uplink grants 410 and other parameters with at least some common information configured for multiple uplink grants 410.

The message format 400 shows the format of a payload 405 of a random access response message (e.g., in a Msg2 of the random access procedure), as a base station may transmit to a UE. The payload 405 includes fields for information bits for: multiple uplink grants 410 (e.g., four uplink grants 410 as shown in FIG. 4, or any other suitable number of uplink grants 410), multiple random access preamble identifiers (e.g., RAPIDs 415), multiple temporary cell identifiers (e.g., TC-RNTIs 420), and multiple fields for other information 425.

As similarly described with reference to FIG. 2, a UE and a base station may utilize multiple sets of uplink resources for the UE to transmit a configuration message (e.g., an RRC connection request message, for example, in a Msg3 of the random access procedure) to the base station. In some cases, the base station may convey multiple uplink grants to the UE, where each uplink grant indicates an allocated set of time, frequency, and/or spatial resources with which the UE may transmit an RRC connection request message. In some cases, the sets of resources indicated in each of the uplink grants 410 may be, for example, partially or completely non-overlapping. For example, the base station may indicate multiple sets of uplink resources in the payload 405 of the random access response message. Additionally or alternatively, the base station may configure each of multiple uplink grants separately in separate random access response message payloads 405, and the base station may transmit each payload 405 using, for example, a PDSCH.

Before transmitting the RRC connection request message, the UE may perform an LBT procedure for one or more of the corresponding sets of allocated resources indicated in the uplink grants 410. If the UE determines that the medium is busy during the resources of a first uplink grant 410 (e.g., according to a first LBT procedure), the UE may perform one or more further LBT procedures for the resources indicated by additional uplink grants 410. After successfully performing one or more LBT procedures for one or more of the allocated sets of resources, the UE may transmit the RRC connection request message on the set resources for which the UE successfully performed the corresponding LBT procedure.

In the example of FIG. 4, the base station may separately (i.e., independently) configure each uplink grant 410 and commonly (i.e., jointly) configure identifiers and/or other information. As shown in FIG. 4, the message format 400 shows a format for a random access response message including separate fields for different uplink grants 410, a common field for a RAPID 415, a common field for a TC-RNTI 420, and separate fields for other information 425. Each field may include one or more bits that signals the respective information. For example, each uplink grant 410 may include information bits that indicate a corresponding set of allocated uplink time, frequency, and/or spatial resources for transmitting the RRC connection request message.

In some cases, the base station may commonly configure one or more field for one or more information bits for the RAPID 415. That is, base station may configure the same RAPID 415 for each of the uplink grants 410. The RAPID 415 may identify the UE as the UE for which the random access response message is intended via a corresponding preamble sequence and/or SSB that the UE may have used to transmit a random access request message (e.g., in a Msg1 of the random access procedure). As shown in FIG. 4, the base station may similarly commonly configure one or more fields for one or more information bits for the TC-RNTI 420 applicable for each of the uplink grants 410. The UE may subsequently use the signaled values for the TC-RNTI 420 to scramble the RRC connection request message transmission. Though not shown in FIG. 4, in other cases, the base station may configure a common RAPID 415, but multiple different TC-RNTIs 420 to be used to transmit RRC connection request messages corresponding to different uplink grants 410. The base station may further similarly commonly configure the one or more fields for one or more information bits for the other information 425 corresponding to respective ones of the uplink grants 410. The other information 425 may include timing information, LBT information, and/or the other information as described herein.

In some cases, the base station may further configure grant multiplicity information to be signaled as part of the payload 405. The configure grant multiplicity information may include one or more grant multiplicity parameters to the UE using the other information 425. The grant multiplicity parameter may indicate a number of repetitions for the UE to transmit the RRC connection request message (among other information for such repetitions). For example, the grant multiplicity information may indicate that the UE transmit four repetitions of the RRC connection request message (providing for relatively improved reliability, e.g., in situations in which the probability of a collision may be relatively higher).

In some cases, in combination with any of the techniques described herein, the base station may configure time or frequency resources to be in common between multiple of the uplink grants 410 (e.g., configuring a same set of time or frequency resources for each of the uplink grants 410). For example, the base station may configure each of the uplink grants 410 to indicate an allocation of the same set of frequency resources, and vary time resources between different uplink grants 410. Alternatively, the base station may configure each of the uplink grants 410 to indicate an allocation of the same set of time resources, and vary frequency resources between different uplink grants 410. Signaling more of the values and parameters in the payload 405 using common parameters may, in some cases, provide for relatively lower transmission smaller and thus relatively lower signaling complexity.

Figure 5:
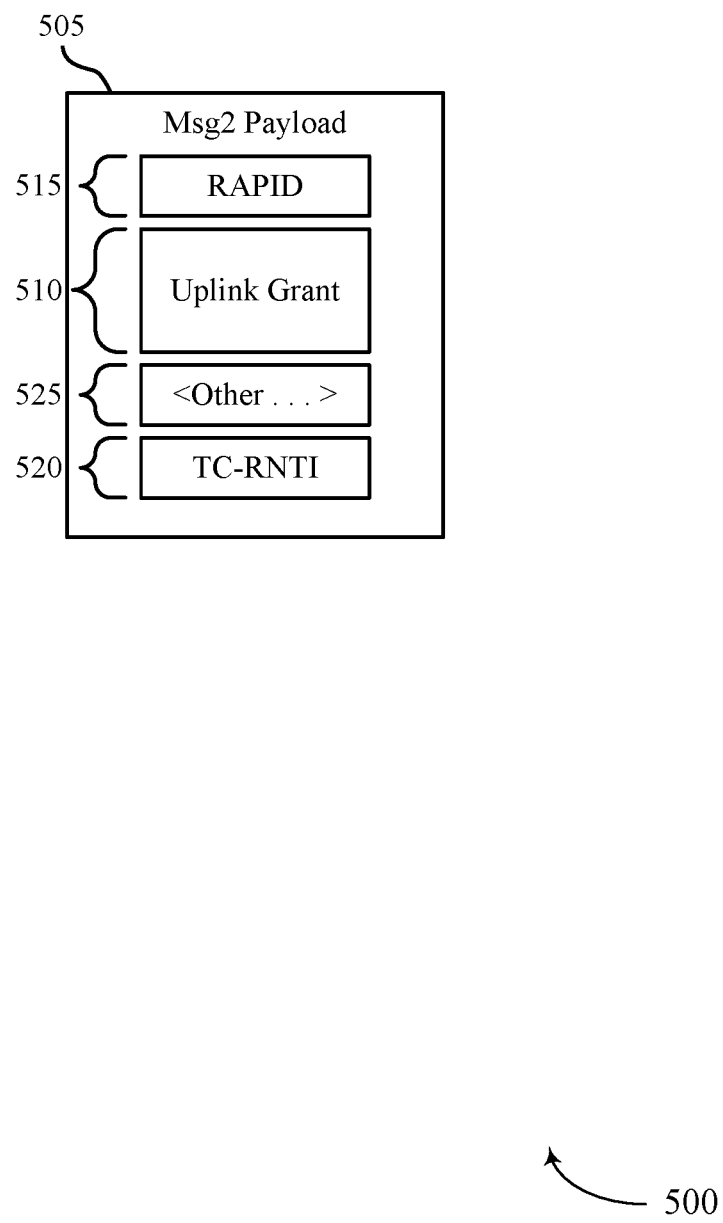
FIG. 5 illustrates an example of a message format for a communications scheme that supports techniques for using multiple sets of uplink resources in a random access procedure in accordance with aspects of the present disclosure.

FIG. 5 illustrates an example of a message format 500 for a communications scheme that supports techniques for using multiple sets of uplink resources in a random access procedure in accordance with aspects of the present disclosure. In some examples, the message format 500 may implement aspects of the wireless communications systems 100 and 200 as described with reference to FIGS. 1 and 2. The message format 500 may, in some cases, implement aspects of the message formats 300 and 400 as described with reference to FIGS. 3 and 4. The message format 500 illustrates a conceptual format for information to be conveyed in a random access response message of a random access procedure between a base station and a UE. The message format 500 illustrates a random access response message format based on which the UE may implicitly derive additional grants.

The message format 500 shows the format of a payload 505 of a random access response message (e.g., in a Msg2 of the random access procedure), as a base station may transmit to a UE. The payload 505 includes fields for information bits for: an uplink grant 510, a random access preamble identifier (e.g., a RAPID 515), a temporary cell identifier (e.g., a TC-RNTIs 520), and one set of fields for other information 525.

In some cases, a UE and a base station may utilize multiple sets of uplink resources for the UE to transmit a configuration message (e.g., an RRC connection request message, for example, in a Msg3 of the random access procedure) to the base station. In some cases, the base station may indicate one uplink grant 510 (or, alternatively, multiple uplink grants 510) for one set of uplink resources in the random access response message, and the UE may derive one or more additional grants implicitly from the first uplink grant 510 (e.g., internally at the UE).

Before transmitting the RRC connection request message, the UE may perform an LBT procedure using the set of allocated resources indicated in the uplink grant 510. If the UE determines that the medium is busy during the resources of a first uplink grant (e.g., according to a first LBT procedure), the UE may perform one or more further LBT procedures for the resources defined by the one or more additional grants that the UE may derive. After successfully performing one or more LBT procedures for one or more of the allocated sets of resources, the UE may transmit the RRC connection request message on the set resources for which the UE successfully performed the corresponding LBT procedure.

In the example of FIG. 5, the base station may configure the uplink grant 510 and the identifiers and/or other information signaled in the payload 505. As shown in FIG. 5, the message format 500 shows a format for a random access response message including separate fields for the uplink grants 510, the RAPID 515, the TC-RNTI 520, and for other information 525. Each field may include one or more bits that signals the respective information. For example, the uplink grant 510 may include information bits that indicate a corresponding set of allocated uplink time, frequency, and/or spatial resources for transmitting the RRC connection request message.

In some cases, based on the uplink grant 510 received from the base station in the random access procedure payload 505, the UE may implicitly derive additional grants of uplink resources (e.g., time, frequency, and/or spatial resources) that the UE may then use to transmit the RRC connection request message. For example, an implicit rule may be defined according to a multiple grant configuration for a wireless communications system including the UE and the base station based on which the UE is configured to operate. In some cases, the UE may perform operations to derive additional grants according to the multiple grant configuration. In some cases, the multiple grant configuration may be signaled to the UE via a separate instance of received signaling (e.g., an RRC configuration signaled in a remaining system information (RMSI) transmission, dedicated RRC signaling in a contention-free random access procedure, etc.). The multiple grant configuration may include parameters indicating, for example, a maximum number of grants that the UE is to derive, a relationship between the resources of the signaled uplink grant 510 and the grants that the UE is to derive (e.g., an overlap, increase, decrease, and the like, in the frequency or time resources for the derived grant), and/or a modulation and coding scheme (MCS) to be used for the signaled uplink grant 510 and the grants that the UE is to derive (e.g., using an identical MCS for the derived grants as the signaled uplink grant 510). In some cases, the UE may derive additional grants based on multiple received uplink grants 510, for example, to generate more sets of resources on which to transmit the RRC connection request message. After deriving the additional grants, the UE may proceed as otherwise described herein (e.g., successfully performing an LBT for one of the derived grants, transmitting the RRC connection request message to the base station using that grant, and so on).

Figure 6:
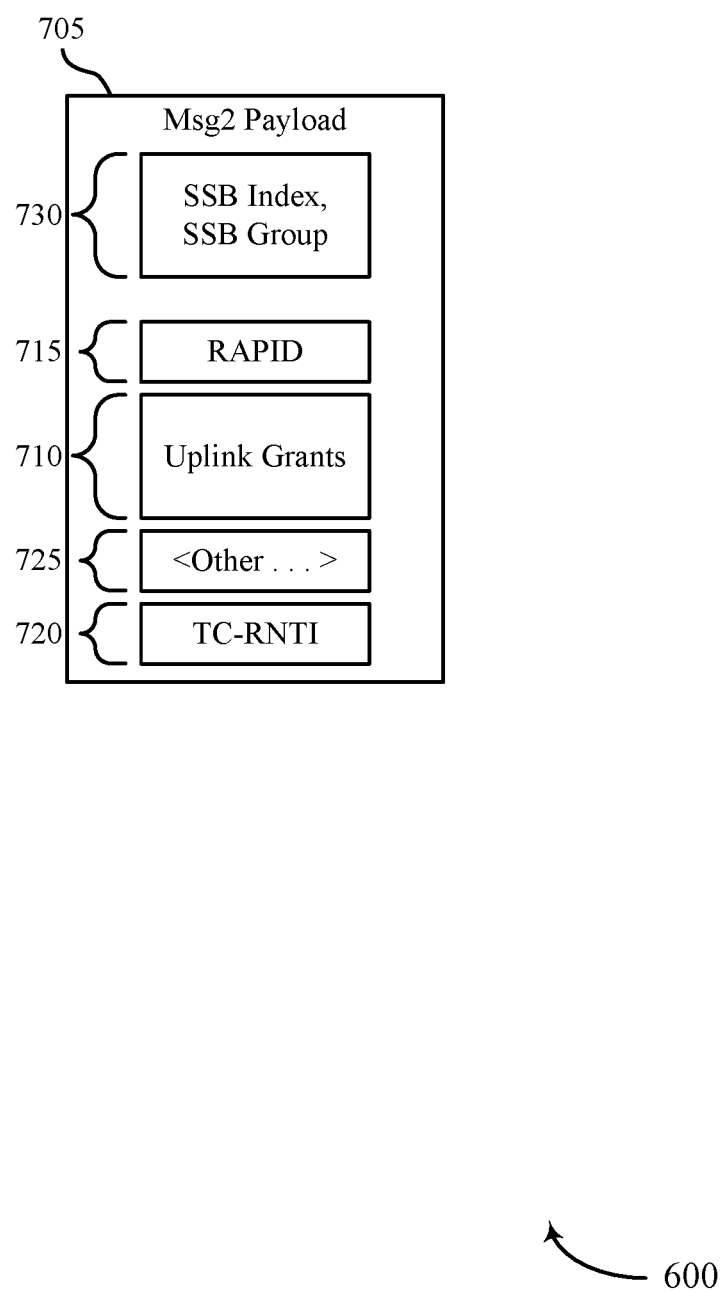
FIG. 6 illustrates an example of a message format for a communications scheme that supports techniques for using multiple sets of uplink resources in a random access procedure in accordance with aspects of the present disclosure.

FIG. 6 illustrates an example of a message format 600 for a communications scheme that supports techniques for using multiple sets of uplink resources in a random access procedure in accordance with aspects of the present disclosure. In some examples, the message format 600 may implement aspects of the wireless communications systems 100 and 200 as described with reference to FIGS. 1 and 2. The message format 600 may, in some cases, implement aspects of the message formats 300, 400, and 500 as described with reference to FIGS. 3 through 5. The message format 600 illustrates a conceptual format for information to be conveyed in a random access response message of a random access procedure between a base station and a UE. The message format 600 illustrates a random access response message format for communicating beam information for directional communications based on a signaled SSB index.

In the example of FIG. 6, the UE may transmit and receive directional communications using one or more directional transmit and/or receive beams. The message format 600 shows the format of a payload 605 of a random access response message (e.g., in a Msg2 of the random access procedure), as a base station may transmit to a UE. The payload 605 includes fields for information bits for: one or more uplink grants 610, a random access preamble identifier (e.g., a RAPID 615), a temporary cell identifier (e.g., a TC-RNTIs 620), a set of fields for other information 625. In the example of the message format 600, the payload 605 further includes one or more fields for one or more information bits for beam information 630, the beam information including, for example, an SSB index and/or an SSB group (i.e., a group of individual SSB indexes) to be used for determining directional transmit beams.

In some cases, a UE and a base station may utilize multiple sets of uplink resources for the UE to transmit a configuration message (e.g., an RRC connection request message, for example, in a Msg3 of the random access procedure) to the base station. As described herein, in some cases, the base station may convey multiple uplink grants to the UE, where each uplink grant indicates an allocated set of time, frequency, and/or spatial resources with which the UE may transmit an RRC connection request message. Additionally or alternatively, as also described herein, the base station may indicate one or more uplink grants 610 based on which the UE may implicitly derive one or more additional grants from the first uplink grant 610.

Before transmitting the RRC connection request message, the UE may perform an LBT procedure using the set of allocated resources indicated in the uplink grants 610. In some cases, the LBT procedure may be a directional LBT procedure in which the UE may listen in multiple transmission direction to determine whether the medium is available for a particular directional beam. If the UE determines that the medium is busy during the resources of a first uplink grant (e.g., according to a first LBT procedure), the UE may perform one or more further LBT procedures (e.g., in one or more additional directions) for the resources defined by the uplink grants 610. The directional LBT procedure may indicate that the medium is available in some directions but busy in other directions. After successfully performing one or more LBT procedures using a certain beam for one or more of the allocated sets of resources, the UE may transmit the RRC connection request message on the set resources for which the UE successfully performed the corresponding LBT procedure (including, e.g., using a directional beam for which the corresponding LBT procedure was successful).

For directional communications using different directional transmit beams, as similarly described herein, the base station may include beam information 630 in the random access response message payload 605. The beam information 630 may, for example, directly indicate beam parameters for one or more directional beams to be used for transmitting the RRC connection request message (e.g., a transmit direction, a transmit power, etc.). As shown in FIG.

6, the base station may indicate in the beam information 630 one or more explicit indications of one or more SSBs for the UE to use to transmit the RRC connection request message. For example, the beam information 630 may indicate an SSB index corresponding to an SSB group for transmission.

Based on the beam information 630, the UE may determine one or more uplink beams to be used to transmit the RRC connection request message according to a beam correspondence (e.g., a correspondence between uplink and downlink beams and/or to indexes and the corresponding communications). For example, the UE may identify a particular beam with particular beam parameters (e.g., a direction, transmit power, etc.) to be used to transmit the RRC connection request message. The UE may then transmit the RRC connection request message according using a directional beam according to the beam information 630 for which the UE successfully performed a directional LBT procedure (e.g., according to the explicit SSB index and SSB group included in the beam information 630).

Figure 7:
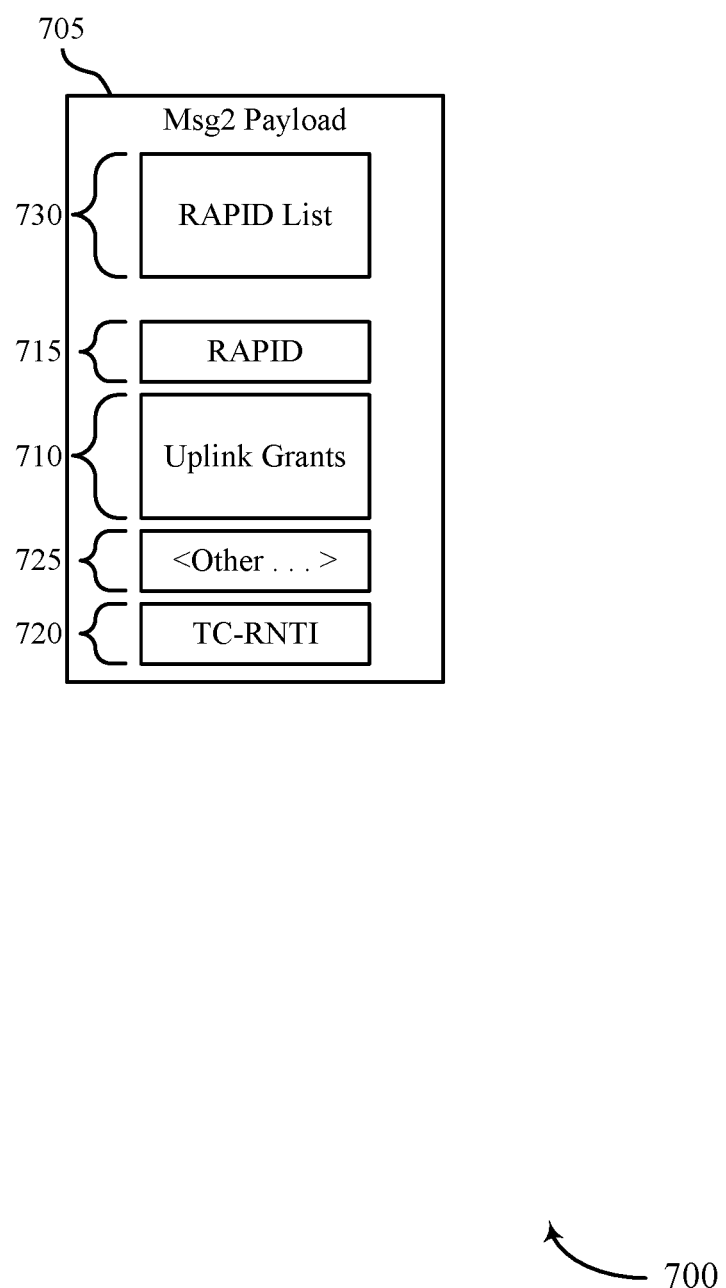
FIG. 7 illustrates an example of a message format for a communications scheme that supports techniques for using multiple sets of uplink resources in a random access procedure in accordance with aspects of the present disclosure.

FIG. 7 illustrates an example of a message format 700 for a communications scheme that supports techniques for using multiple sets of uplink resources in a random access procedure in accordance with aspects of the present disclosure. In some examples, the message format 700 may implement aspects of the wireless communications systems 100 and 200 as described with reference to FIGS. 1 and 2. The message format 700 may, in some cases, implement aspects of the message formats 300, 400, 500, and 600 as described with reference to FIGS. 3 through 6. The message format 700 illustrates a conceptual format for information to be conveyed in a random access response message of a random access procedure between a base station and a UE. The message format 700 illustrates a random access response message format for communicating beam information for directional communications based on a signaled RAPID 715.

In the example of FIG. 7, the UE may transmit and receive directional communications using one or more directional transmit and/or receive beams. The message format 700 shows the format of a payload 705 of a random access response message (e.g., in a Msg2 of the random access procedure), as a base station may transmit to a UE. The payload 705 includes fields for information bits for: one or more uplink grants 710, a random access preamble identifier (e.g., a RAPID 715), a temporary cell identifier (e.g., a TC-RNTIs 720), a set of fields for other information 725. In the example of the message format 700, the payload 705 further includes one or more fields for one or more information bits for beam information 730, the beam information including, for example, a list of RAPIDs to be used for determining directional transmit beams.

In some cases, a UE and a base station may utilize multiple sets of uplink resources for the UE to transmit a configuration message (e.g., an RRC connection request message, for example, in a Msg3 of the random access procedure) to the base station. As described herein, in some cases, the base station may convey multiple uplink grants to the UE, where each uplink grant indicates an allocated set of time, frequency, and/or spatial resources with which the UE may transmit an RRC connection request message. Additionally or alternatively, as also described herein, the base station may indicate one or more uplink grants 710 based on which the UE may implicitly derive one or more additional grants from the first uplink grant 710.

Before transmitting the RRC connection request message, the UE may perform an LBT procedure using the set of allocated resources indicated in the uplink grants 710. In some cases, the LBT procedure may be a directional LBT procedure in which the UE may listen in multiple transmission direction to determine whether the medium is available for a particular directional beam. If the UE determines that the medium is busy during the resources of a first uplink grant (e.g., according to a first LBT procedure), the UE may perform one or more further LBT procedures (e.g., in one or more additional directions) for the resources defined by the uplink grants 710. The directional LBT procedure may indicate that the medium is available in some directions but busy in other directions. After successfully performing one or more LBT procedures using a certain beam for one or more of the allocated sets of resources, the UE may transmit the RRC connection request message on the set resources for which the UE successfully performed the corresponding LBT procedure (including, e.g., using a directional beam for which the corresponding LBT procedure was successful).

For directional communications using different directional transmit beams, as similarly described herein, the base station may include beam information 730 in the random access response message payload 705. The beam information 730 may include information based on which the UE may determine beam parameters for one or more directional beams to be used for transmitting the RRC connection request message (e.g., a transmit direction, a transmit power, etc.). As shown in FIG. 7, the base station may indicate in the beam information 730 a list of RAPIDs corresponding to one or more random access preambles (e.g., as the UE may use to transmit random access request messages).

In some cases, the UE may derive beam indexes to be used to transmit the RRC connection request message according to the information included in the random access response message payload 705. Based on the beam information 730, the UE may determine one or more uplink beams to be used to transmit the RRC connection request message according to a beam correspondence between the RAPIDs of the list of RAPIDs indicated in the beam information and indexes or parameters of particular transmit beams. For example, the base station and UE may map each preamble of one or more random access request messages to a corresponding SSB index or group of SSB indexes, and an index of the preambles may map to corresponding RAPIDs. Through this correspondence, the base and the UE station may identify a particular transmit beam to the UE based on the list of RAPIDs in the beam information 730. In this way, in some cases, the base station identify a transmit beam via its corresponding RAPID even though the UE did not transmit the random access request message using the corresponding RAPID.

The UE may correspondingly determine beam parameters for one or more transmit beams for one or more subsequent RRC connection request messages using one or more beams corresponding to the respective RAPIDs received in the list of RAPIDs. For example, the UE may identify a beam with particular beam parameters (e.g., a direction, transmit power, etc.) to be used to transmit the RRC connection request message based on the beam parameters corresponding to those mapped to a certain RAPID preamble.

In some cases, the UE may use determine a signal strength associated with each of the transmit beams indicated via the list of RAPIDs, and the UE may determine to transmit one or more RRC connection request messages using a transmit beam for which the UE determined to have a strongest signal strength (or the multiple transmit beams with the strongest signal strengths). The UE may then transmit the RRC connection request message using the directional beam or beams accordingly.

Figure 8:
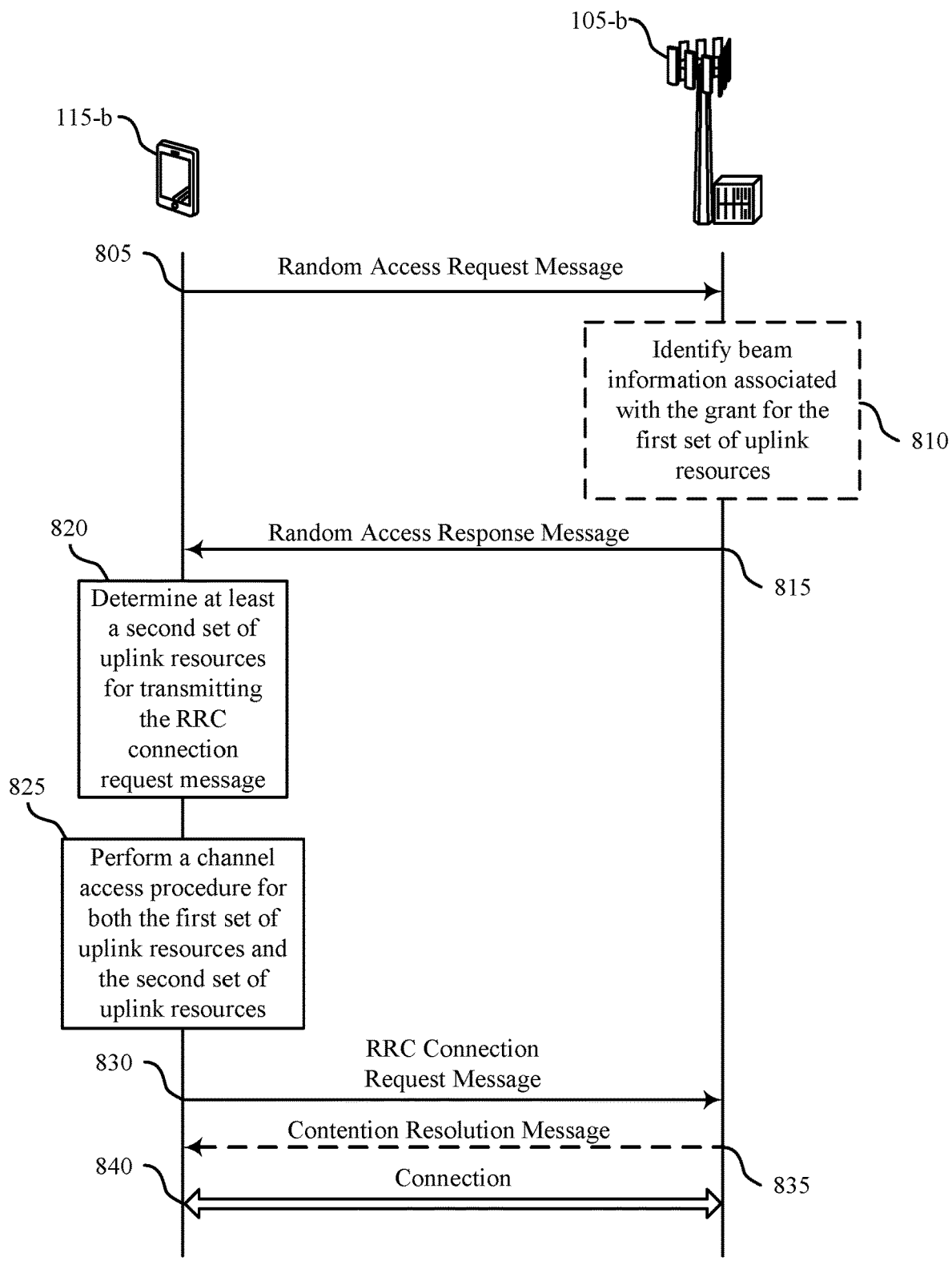
FIG. 8 illustrates an example of a process flow that supports techniques for using multiple sets of uplink resources in a random access procedure in accordance with aspects of the present disclosure.

FIG. 8 illustrates an example of a process flow 800 that supports techniques for using multiple sets of uplink resources in a random access procedure in accordance with aspects of the present disclosure. In some examples, the process flow 800 may implement aspects of the wireless communications system, as described with reference to FIG. 1 through 7. The process flow 800 shows an example of communications between a base station 105-*b* and a UE 115-*b*, which may be examples of the corresponding devices as described with reference to FIGS. 1 through 7.

At 805, the UE 115-*b* may transmit to the base station 105-*b*, and the base station 105-*b* may receive from the UE 115-*b*, a random access request message. The random access request message may be, for example, a PRACH transmission transmitted using a set of resources allocated for PRACH transmissions. In some cases, the random access request message may include a preamble, for example, selected from a set of preamble sequences, such as a set of preamble sequences associated with a cell.

At 810, the base station 105-*b* may identify beam information associated with the grant for the first set of uplink resources (e.g., to configure direction transmissions from the UE 115-*b* using one of multiple possible uplink transmit beams).

At 815, the base station 105-*b* may transmit to the UE 115-*b*, and the UE 115-*b* may receive from the base station 105-*b*, a random access response message in response to the random access request message. In some cases, the random access response message may include a grant for a first set of uplink resources for transmitting an RRC connection request message (e.g., a Msg3 of a random access procedure) to the base station 105-*b* (e.g., at 830). In some cases, the random access response message may include one or more additional grants for at least the second set of uplink resources transmitting the RRC connection request message to the base station 105-*b*.

In some cases, the grant and/or the one or more additional grants may include respective channel access procedure parameters for accessing the first set of uplink resources or the second set of uplink resources. In some cases, the channel access procedure parameters may include a channel access priority, COT information, or a combination thereof, associated with the corresponding first set of uplink resources or second set of uplink resources.

In some cases, the random access response message may include timing information, where the timing information may indicate a time-domain offset between the random access response message, the one or more of the first set of uplink resources, the second set of uplink resources, or a combination thereof. In some cases, the random access response message may include grant multiplicity information, the grant multiplicity information indicating a number of grants to be used for repeating transmission of the RRC connection request message.

In some cases, for example, for directional communications, the random access response message may indicate beam information associated with the grant for the first set of uplink resources, and beam parameters for an uplink beam (e.g., a transmit beam) to be used to transmit the RRC connection request message are based on the beam information. The beam information may indicate a mapping of one or more beam indexes according to one or more corresponding random access preamble identifiers. Alternatively, the beam information may indicate one or more downlink beam parameters for a downlink beam used to receive synchronization signals from the base station 105-*b*, and the UE 115-*b* may determine the uplink beam to be used to transmit the RRC connection request message based on a correspondence between the downlink beam parameters and the uplink beam parameters (e.g., a transmit-receive beam correspondence). In some cases, a downlink beam used to receive the synchronization signals from the base station may be different than a second downlink beam used to receive the random access response message from the base station at 815 (e.g., different downlink beams using different sets of frequency resources). In some cases, the UE 115-*b* may determine the uplink beam to be used to transmit the RRC connection request message to the base station based on the beam parameters for the uplink beam.

At 820, the UE 115-*b* may determine at least a second set of uplink resources for transmitting the RRC connection request message to the base station based on the grant for the first set of uplink resources. In some cases, determining at least the second set of uplink resources may be based on the one or more additional grants received from the base station 105-*b*. In some cases, each of the grant and the one or more additional grants may include a random access preamble identifier (e.g., a RAPID), and/or a temporary cell identifier (e.g., a TC-RNTI) for the random access request message of the UE. In some cases, each of the random access preamble identifiers and/r the temporary cell identifiers of each of the grant and the one or more additional grants may have a same value. Alternatively, in other cases, each of the random access preamble identifiers and/or the temporary cell identifiers of each of the grant and the one or more additional grants may have a different value.

In some cases, the UE 115-*a* may have previously received a multiple grant configuration, for example, via a system information block (SIB) message, an RMSI message, a dedicated signaling message, or a combination thereof. In some such cases, the UE 115-*b* may determine at least the second set of uplink resources for transmitting the RRC connection request message to the base station 105-*b* based on the multiple grant configuration. That is, the UE 115-*b* may perform operations to internally derive additional grants according to the multiple grant configuration. For example, the UE 115-*b* may determine at least the second set of uplink resources for transmitting the RRC connection request message to the base station 105-*b* based on the multiple grant configuration. The multiple grant configuration may include parameters indicating, for example, a maximum number of grants that the UE is to derive, a relationship between the resources of the signaled uplink grant 510 and the grants that the UE is to derive (e.g., an overlap, increase, decrease, and the like, in the frequency or time resources for the derived grant), and/or an MCS to be used for the signaled uplink grant 510 and the grants that the UE is to derive (e.g., using an identical MCS for the derived grants as the signaled uplink grant 510).

At 825, the UE 115-*b* may perform a channel access procedure (e.g., an LBT procedure) for both the first set of uplink resources and the second set of uplink resources.

The LBT procedure may, for example, prevent interference and collisions with communications between another UE 115 and the base station 105-*b*, another UE 115 and another base station 105, higher priority transmissions (e.g., radar), etc. In some cases, before each of the messages of the random access procedure, the UE 115-*b* and/or the base station 105-*b* may perform an LBT procedure to contend for access to the transmission medium or channel. In some cases, the UE 115-*b* may perform a directional LBT procedure in multiple transmission direction, for example, for communications systems employing directional transmit and receive beams.

At 830, the UE 115-b may transmit to the base station 105-b, and the base station 105-b may receive from the UE 115-b, an RRC connection request message. In some cases, the UE 115-b may transmit the RRC connection request message using the uplink beam, as may have been determined based on the beam information received at 815.

In some case, the UE 115-b may determine a signal strength for beams used to communicate using each of the first set of uplink resources and the second set of uplink resources, and the UE 115-b may transmit the RRC connection request message using whichever of the first set of uplink resources or the second set of uplink resources is associated with a greatest signal strength (e.g., an uplink transmit beam with a strongest signal strength). In some cases, the UE 115-b may transmit the RRC connection request message according to the timing information received from the base station 105-b, for example, in the random access response message at 815. In some cases, the UE 115-b may transmit the RRC connection request message using whichever of the first set of uplink resources or the second set of uplink resources has an earliest time component.

In some cases, the UE 115-b may transmit the RRC connection request message based on a successful result of one or more of the channel access procedures according to the respective channel access procedure parameters received with the respective uplink grants at 815. In some cases, the UE 115-b may transmit the RRC connection request message using whichever of the first set of uplink resources or the second set of uplink resources corresponds to a first successful channel access procedure, for example at 825.

In some cases, the UE 115-b may repeat transmission of the RRC connection request message to the base station using one or more of the first set of uplink resources or the second set of uplink resources (e.g., using a number of uplink grants as may have been configured according to the multiple grant configuration and/or the grant multiplicity information).

At 835, the base station 105-b may transmit to the UE 115-b, and the UE 115-b may receive from the base station 105-b, a contention resolution message, for example, in response to receiving the RRC connection request message at 830. In some examples, the contention resolution message may be transmitted on the PDSCH, and may be scrambled using the same temporary network identifier used to scramble the RRC connection request message. The contention resolution message may include, for example, the UE identifier received in the RRC connection request message 215 and/or other information for contention resolution At 840, the UE 115-b and the base station 105-b may establish a connection based on the RRC connection request message. The UE 115-b and the base station 105-b may use the connection for subsequent transmissions of data and other communications.

Figure 9:
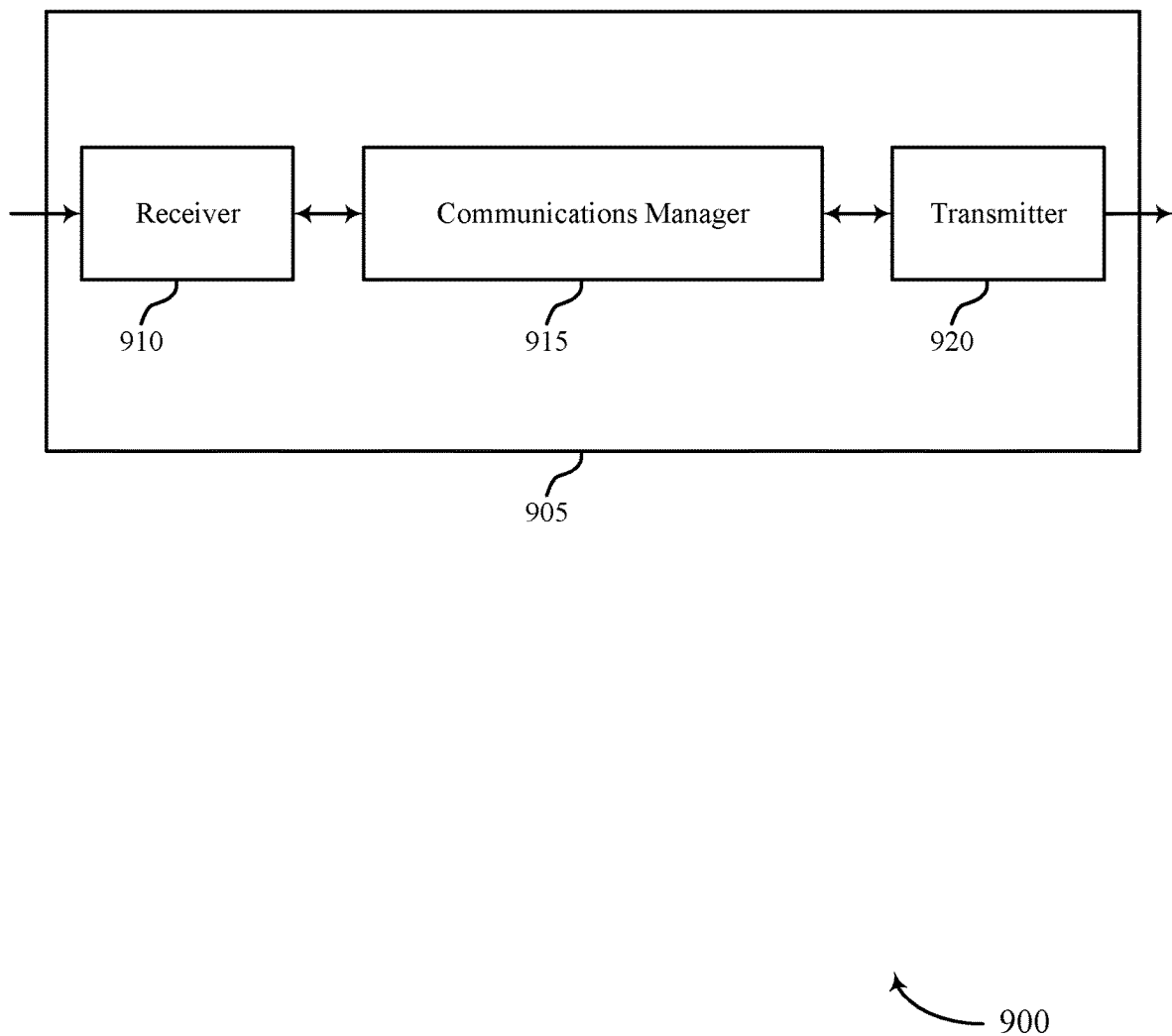
FIGS. 9 and 10 show block diagrams of devices that support techniques for using multiple sets of uplink resources in a random access procedure in accordance with aspects of the present disclosure.

FIG. 9 shows a block diagram 900 of a device 905 that supports techniques for using multiple sets of uplink resources in a random access procedure in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for using multiple sets of uplink resources in a random access procedure, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a random access request message to a base station, receive a random access response message from the base station in response to the random access request message, the random access response message including a grant for a first set of uplink resources for transmitting an RRC connection request message to the base station, determine at least a second set of uplink resources for transmitting the RRC connection request message to the base station based on the grant for the first set of uplink resources, transmit the RRC connection request message to the base station using one or more of the first set of uplink resources or the second set of uplink resources, and establish a connection with the base station based on the RRC connection request message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
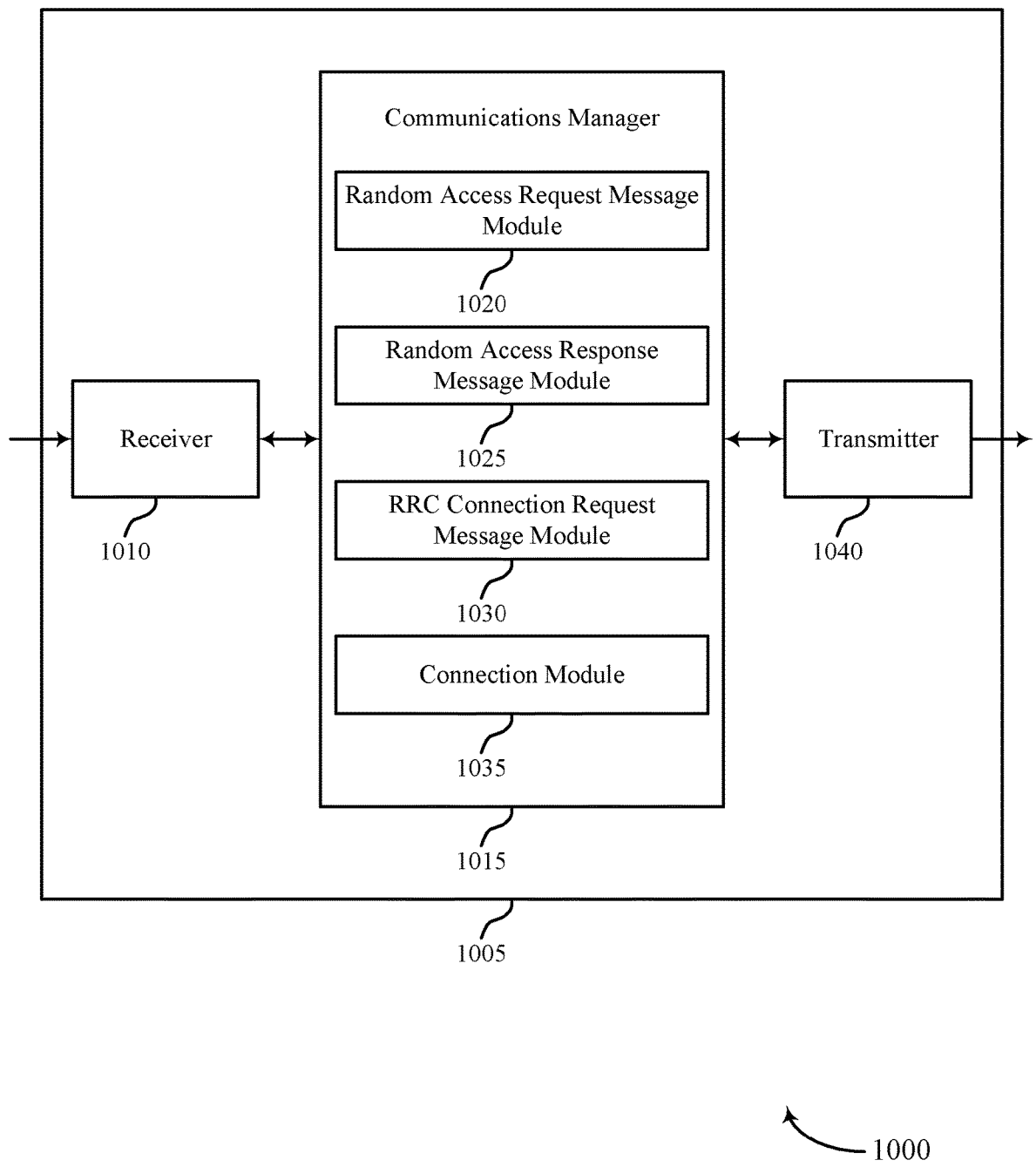

FIG. 10 shows a block diagram 1000 of a device 1005 that supports techniques for using multiple sets of uplink resources in a random access procedure in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for using multiple sets of uplink resources in a random access procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a random access request message module 1020, a random access response message module 1025, an RRC connection request message module 1030, and a connection module 1035. The communications manager 1015 may be an example of aspects of the communications manager 1210 described herein.

The random access request message module 1020 may transmit a random access request message to a base station.

The random access response message module 1025 may receive a random access response message from the base station in response to the random access request message, the random access response message including a grant for a first set of uplink resources for transmitting an RRC connection request message to the base station.

The RRC connection request message module 1030 may determine at least a second set of uplink resources for transmitting the RRC connection request message to the base station based on the grant for the first set of uplink resources and transmit the RRC connection request message to the base station using one or more of the first set of uplink resources or the second set of uplink resources.

The connection module 1035 may establish a connection with the base station based on the RRC connection request message.

In some implementations, the actions performed by the random access request message module 1020, the random access response message module 1025, the RRC connection request message module 1030, and the connection module 1035, as described herein, may facilitate the processor 1240, as described with reference to FIG. 12, to more efficiently cause the device 1005 to perform various functions. For example, the device 1005 may scale and/or time-shift the RRC connection request message based on the resources indicated in uplink grants included in random access response messages received from the base station. This may provide, for example, a relatively increased time diversity at the device 1005 for performing LBT operations (i.e., increased diversity between the different sets of resources for which the device 1005 may perform LBT operations). The increased time diversity may, in some cases, correspondingly increase the probability that the device 1005 successfully performs LBT procedures according to the uplink grants. Accordingly, the device 1005 may reduce a number of processing operations at the processor and other components of the device 1005, which may in turn provide power savings and conserve processing resources for the processor of the device 1005.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
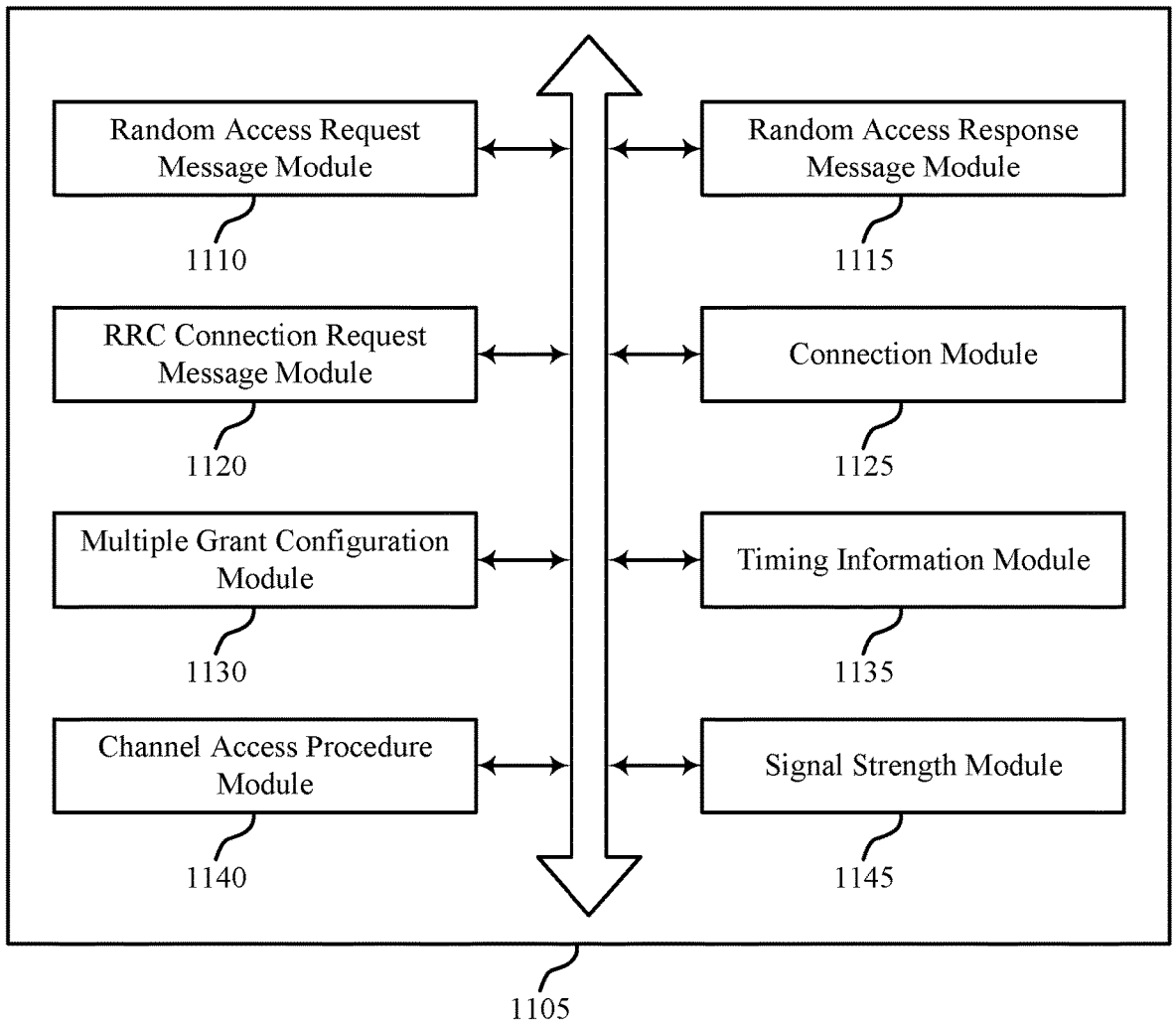
FIG. 11 shows a block diagram of a communications manager that supports techniques for using multiple sets of uplink resources in a random access procedure in accordance with aspects of the present disclosure.

FIG. 11 shows a block diagram 1100 of a communications manager 1105 that supports techniques for using multiple sets of uplink resources in a random access procedure in accordance with aspects of the present disclosure. The communications manager 1105 may be an example of aspects of a communications manager 915, a communications manager 1015, or a communications manager 1210 described herein. The communications manager 1105 may include a random access request message module 1110, a random access response message module 1115, an RRC connection request message module 1120, a connection module 1125, a multiple grant configuration module 1130, a timing information module 1135, a channel access procedure module 1140, and a signal strength module 1145. Each of these modules may communicate, directly or indirectly, with one another (e.g., via one or more buses).

The random access request message module 1110 may transmit a random access request message to a base station.

The random access response message module 1115 may receive a random access response message from the base station in response to the random access request message, the random access response message including a grant for a first set of uplink resources for transmitting an RRC connection request message to the base station. In some cases, the random access response message includes grant multiplicity information, the grant multiplicity information indicating a number of grants to be used for repeating transmission of the RRC connection request message, and where repeating transmission of the RRC connection request message to the base station is based on the grant multiplicity information. In some cases, the random access response message includes one or more additional grants for at least the second set of uplink resources, and determining at least the second set of uplink resources is based on the one or more additional grants.

In some cases, each of the grant and the one or more additional grants includes a random access preamble identifier for transmitting the RRC connection request message, each of the random access preamble identifiers of each of the grant and the one or more additional grants having a same value. In some cases, each of the grant and the one or more additional grants includes a random access preamble identifier for transmitting the RRC connection request message, one or more of the random access preamble identifiers of the grant and the one or more additional grants having different values.

In some cases, each of the grant and the one or more additional grants includes a temporary cell identifier for transmitting the RRC connection request message, each of the temporary cell identifiers of each of the grant and the one or more additional grants having a same value. In some cases, each of the grant and the one or more additional grants includes a temporary cell identifier for transmitting the RRC connection request message, one or more of the temporary cell identifiers of the grant and the one or more additional grants having different values.

In some cases, the random access response message indicates beam information associated with the grant for the first set of uplink resources, and beam parameters for an uplink beam to be used to transmit the RRC connection request message are based on the beam information. In some cases, the beam information indicates a mapping of one or more beam indexes according to one or more corresponding random access preamble identifiers.

The RRC connection request message module 1120 may determine at least a second set of uplink resources for transmitting the RRC connection request message to the base station based on the grant for the first set of uplink resources. In some examples, the RRC connection request message module 1120 may transmit the RRC connection request message to the base station using one or more of the first set of uplink resources or the second set of uplink resources. In some examples, the RRC connection request message module 1120 may repeat transmission of the RRC connection request message to the base station using one or more of the first set of uplink resources or the second set of uplink resources. In some examples, the RRC connection request message module 1120 may transmit the RRC connection request message according to the timing information.

In some examples, the RRC connection request message module 1120 may transmit the RRC connection request message using whichever of the first set of uplink resources or the second set of uplink resources has an earliest time component. In some examples, the RRC connection request message module 1120 may transmit the RRC connection request message using whichever of the first set of uplink resources or the second set of uplink resources corresponds to a first successful channel access procedure. In some examples, the RRC connection request message module 1120 may transmit the RRC connection request message using whichever of the first set of uplink resources or the second set of uplink resources is associated with a greatest signal strength.

In some examples, the RRC connection request message module 1120 may determine the uplink beam to be used to transmit the RRC connection request message to the base station based on the beam parameters for the uplink beam. In some examples, the RRC connection request message module 1120 may transmit the RRC connection request message to the base station using the uplink beam. In some cases, the beam information indicates one or more downlink beam parameters for a downlink beam used to receive synchronization signals from the base station, and determining the uplink beam to be used to transmit the RRC connection request message is based on a correspondence between the downlink beam parameters and the uplink beam parameters for the uplink beam. In some cases, the downlink beam used to receive the synchronization signals from the base station is different than a second downlink beam used to receive the random access response message from the base station.

The connection module 1125 may establish a connection with the base station based on the RRC connection request message.

The multiple grant configuration module 1130 may receive a multiple grant configuration in a SIB message, an RMSI message, a dedicated signaling message, or a combination thereof. In some examples, the multiple grant configuration module 1130 may determine at least the second set of uplink resources for transmitting the RRC connection request message to the base station based on the multiple grant configuration. In some cases, the multiple grant configuration indicates a maximum number of grants, a relationship between the first set of uplink resources and the second set of uplink resources, an MCS, or a combination thereof.

The timing information module 1135 may receive timing information from the base station, the timing information indicating a time-domain offset between the random access response message, the one or more of the first set of uplink resources, the second set of uplink resources, or a combination thereof.

The channel access procedure module 1140 may perform a channel access procedure for both the first set of uplink resources and the second set of uplink resources. In some cases, each of the grant and the one or more additional grants includes respective channel access procedure parameters for the first set of uplink resources or the second set of uplink resources, and transmitting the RRC connection request message to the base station is based on a successful result of one or more of the channel access procedures according to the respective channel access procedure parameters. In some cases, the channel access procedure parameters include a channel access priority, COT information, or a combination thereof, associated with the corresponding first set of uplink resources or second set of uplink resources.

The signal strength module 1145 may determine a signal strength associated with each of the first set of uplink resources and the second set of uplink resources.

Figure 12:
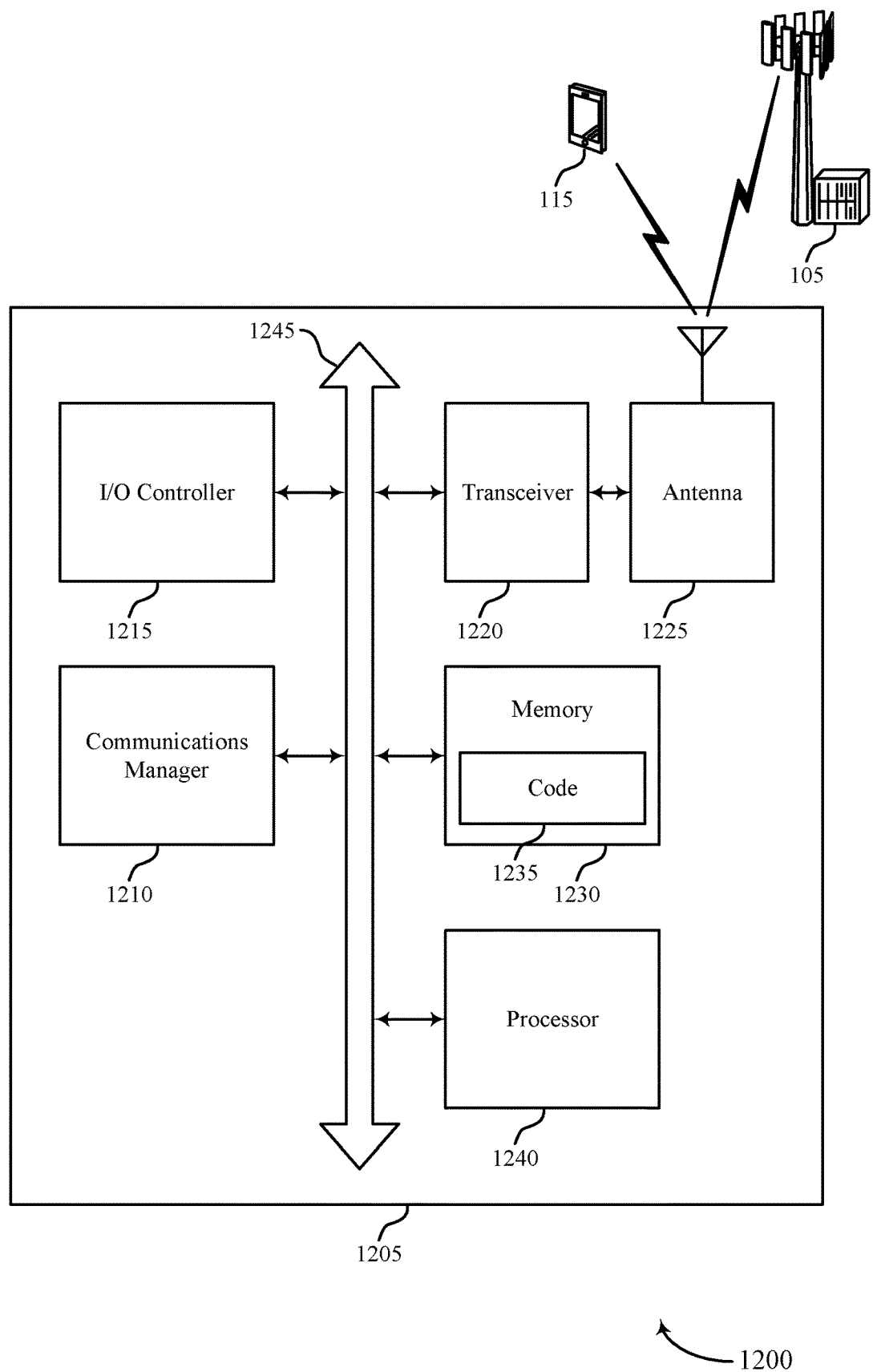
FIG. 12 shows a diagram of a system including a device that supports techniques for using multiple sets of uplink resources in a random access procedure in accordance with aspects of the present disclosure.

FIG. 12 shows a diagram of a system 1200 including a device 1205 that supports techniques for using multiple sets of uplink resources in a random access procedure in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit a random access request message to a base station, receive a random access response message from the base station in response to the random access request message, the random access response message including a grant for a first set of uplink resources for transmitting an RRC connection request message to the base station, determine at least a second set of uplink resources for transmitting the RRC connection request message to the base station based on the grant for the first set of uplink resources, transmit the RRC connection request message to the base station using one or more of the first set of uplink resources or the second set of uplink resources, and establish a connection with the base station based on the RRC connection request message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for using multiple sets of uplink resources in a random access procedure).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
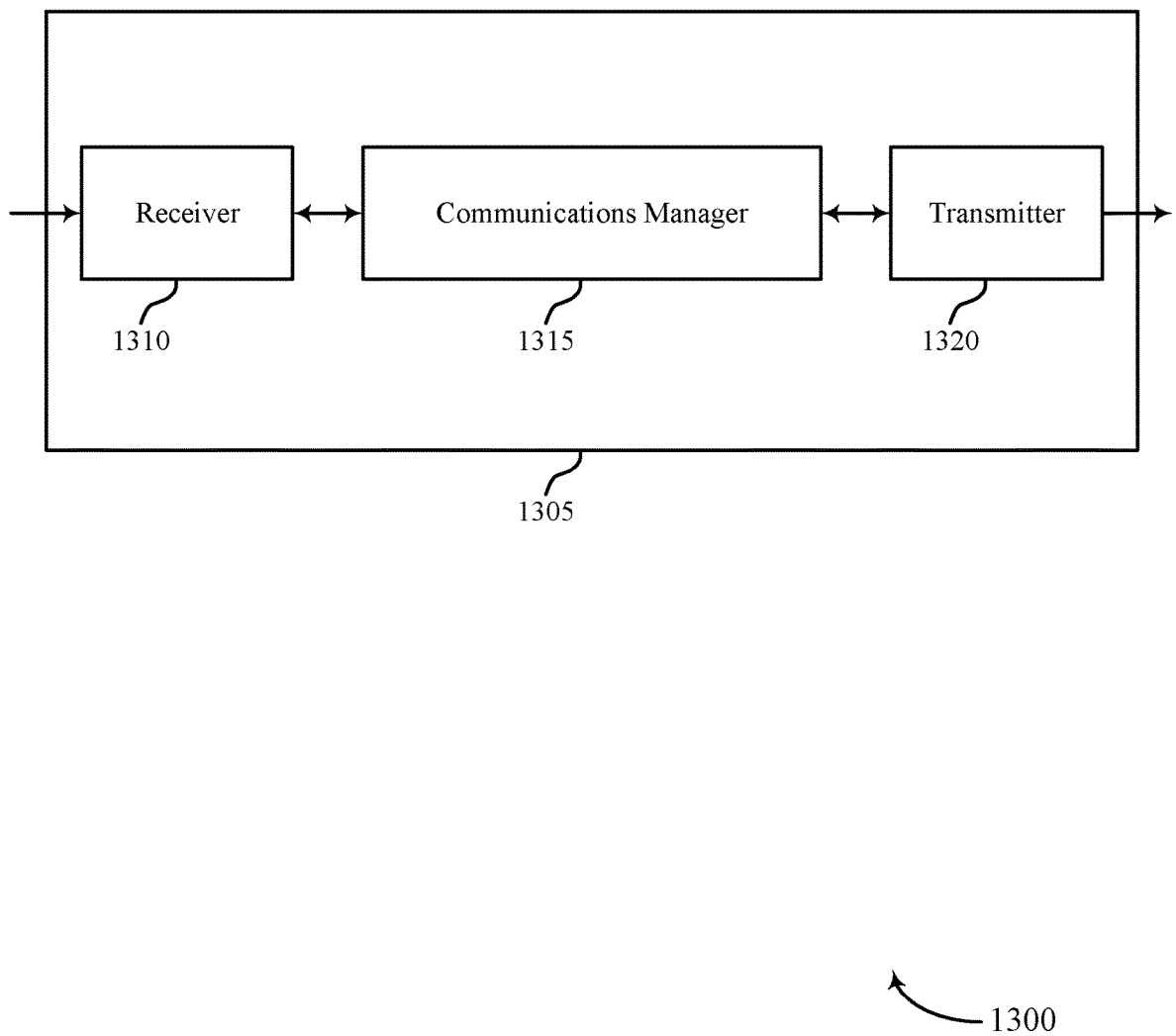
FIGS. 13 and 14 show block diagrams of devices that support techniques for using multiple sets of uplink resources in a random access procedure in accordance with aspects of the present disclosure.

FIG. 13 shows a block diagram 1300 of a device 1305 that supports techniques for using multiple sets of uplink resources in a random access procedure in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for using multiple sets of uplink resources in a random access procedure, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive a random access request message from a UE, transmit a random access response message to the UE in response to the random access request message, the random access response message including a grant for a first set of uplink resources for receiving an RRC connection request message from the UE, receive the RRC connection request message from the UE using one or more of the first set of uplink resources or a second set of uplink resources, the second set of uplink resources based on the grant for the first set of uplink resources, and establish a connection with the UE based on the RRC connection request message. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
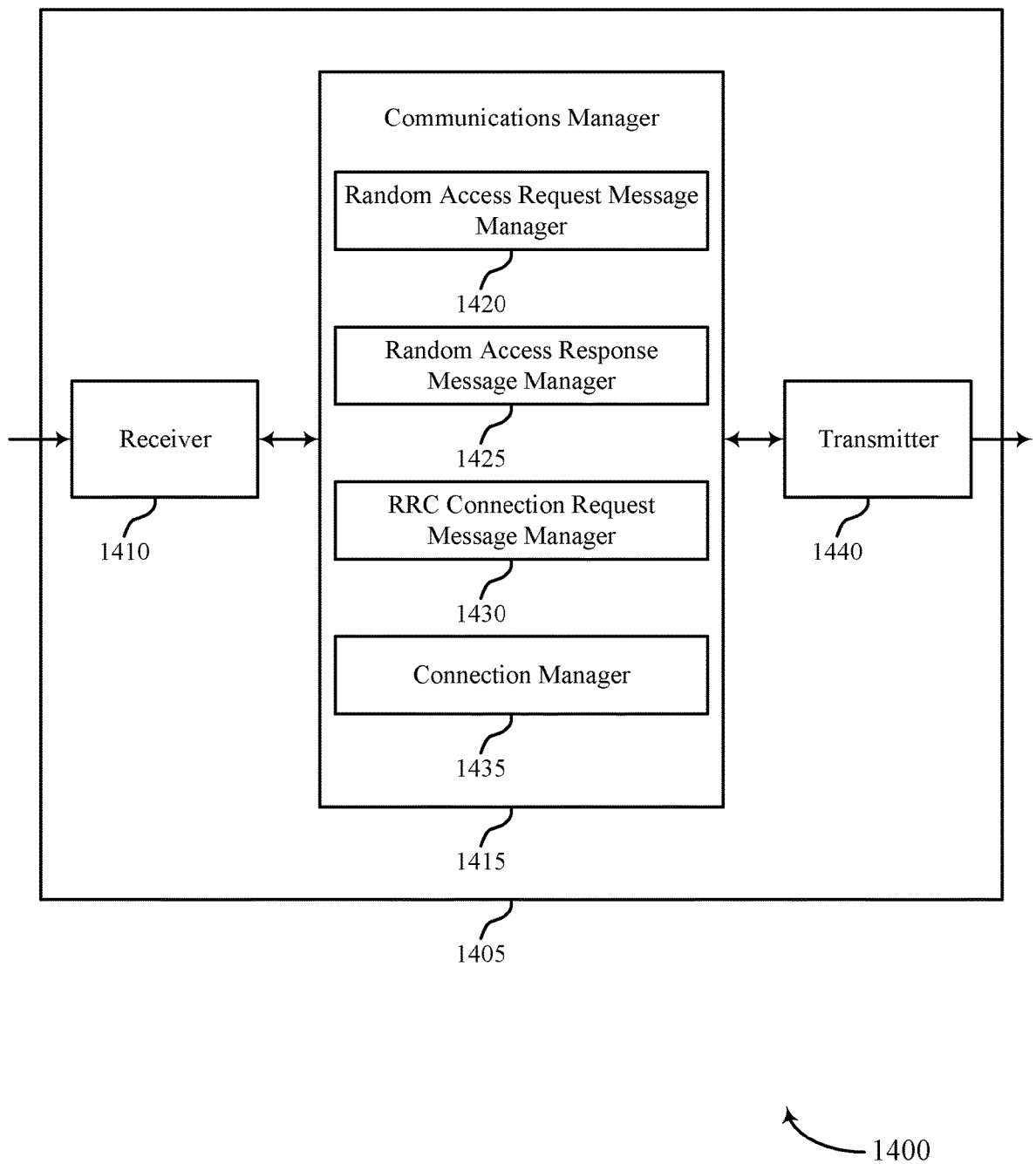

FIG. 14 shows a block diagram 1400 of a device 1405 that supports techniques for using multiple sets of uplink resources in a random access procedure in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for using multiple sets of uplink resources in a random access procedure, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a random access request message manager 1420, a random access response message manager 1425, an RRC connection request message manager 1430, and a connection manager 1435. The communications manager 1415 may be an example of aspects of the communications manager 1610 described herein.

The random access request message manager 1420 may receive a random access request message from a UE.

The random access response message manager 1425 may transmit a random access response message to the UE in response to the random access request message, the random access response message including a grant for a first set of uplink resources for receiving an RRC connection request message from the UE.

The RRC connection request message manager 1430 may receive the RRC connection request message from the UE using one or more of the first set of uplink resources or a second set of uplink resources, the second set of uplink resources based on the grant for the first set of uplink resources.

The connection manager 1435 may establish a connection with the UE based on the RRC connection request message.

In some implementations, the actions performed by the random access request message manager 1420, the random access response message manager 1425, the RRC connection request message manager 1430, and the connection manager 1435, as described herein, may facilitate the processor 1640, as described with reference to FIG. 16, to more efficiently cause the device 1405 to perform various functions. For example, the device 1405 indicating resources in uplink grants included in random access response messages transmitted to the UE may facilitate the UE to scale and/or time-shift the RRC connection request message, which may relatively increase time diversity for the UE to perform LBT operations (i.e., providing increased diversity between different sets of resources for which the UE may perform LBT operations). The increased time diversity may, in some cases, correspondingly increase the probability that the UE successfully performs LBT procedures according to the uplink grants. This may conserve over-the-air resources for communications between the device 1405 and, for example, other UEs, as well as providing efficiencies at the device 14-05. The device 1405 may reduce a number of processing operations at the processor and other components of the device 1405, which may in turn provide power savings and conserve processing resources for the processor of the device 1405.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
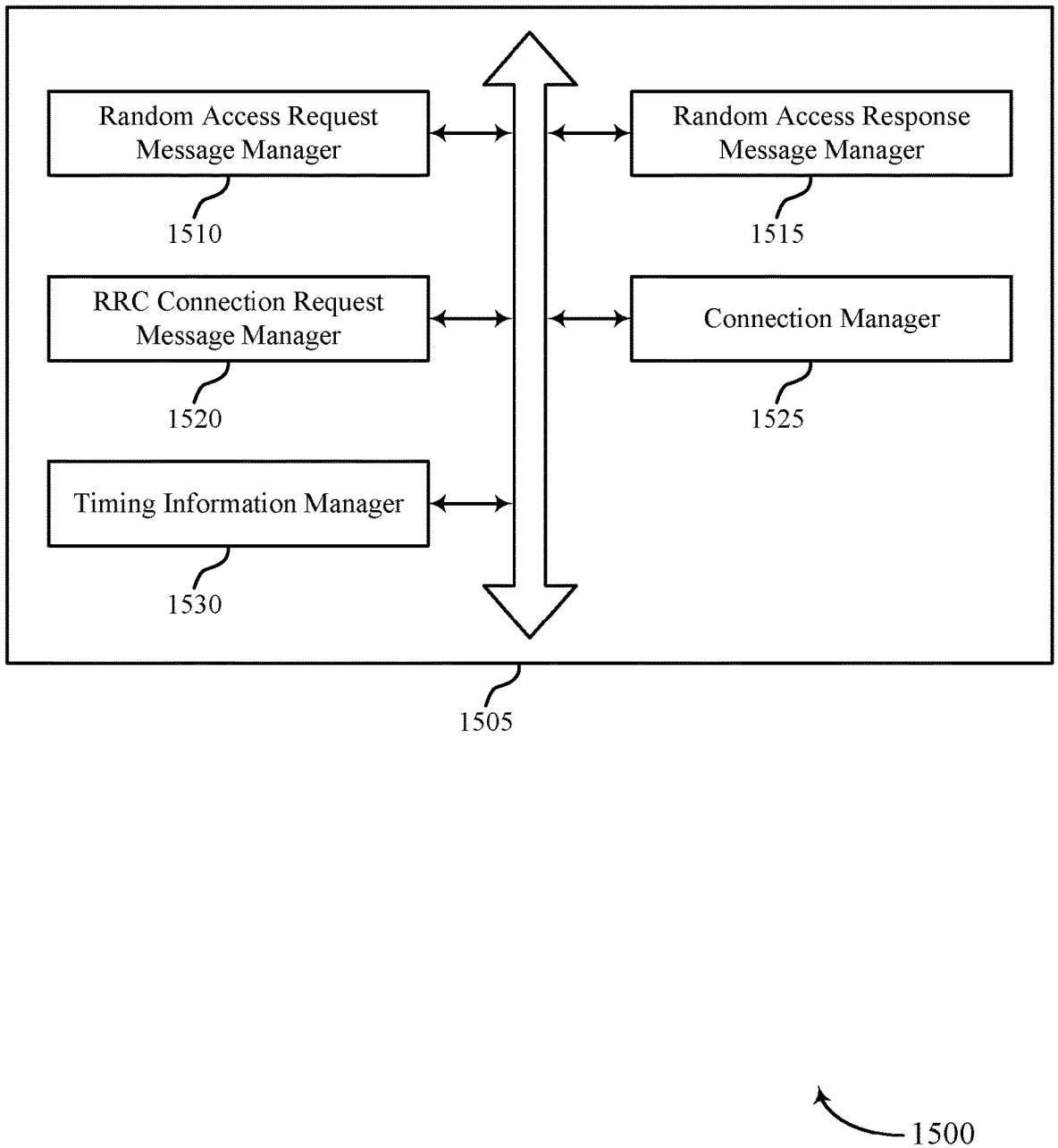
FIG. 15 shows a block diagram of a communications manager that supports techniques for using multiple sets of uplink resources in a random access procedure in accordance with aspects of the present disclosure.

FIG. 15 shows a block diagram 1500 of a communications manager 1505 that supports techniques for using multiple sets of uplink resources in a random access procedure in accordance with aspects of the present disclosure. The communications manager 1505 may be an example of aspects of a communications manager 1315, a communications manager 1415, or a communications manager 1610 described herein. The communications manager 1505 may include a random access request message manager 1510, a random access response message manager 1515, an RRC connection request message manager 1520, a connection manager 1525, and a timing information manager 1530. Each of these modules may communicate, directly or indirectly, with one another (e.g., via one or more buses).

The random access request message manager 1510 may receive a random access request message from a UE.

The random access response message manager 1515 may transmit a random access response message to the UE in response to the random access request message, the random access response message including a grant for a first set of uplink resources for receiving an RRC connection request message from the UE.

In some cases, the random access response message includes one or more additional grants for the first set of uplink resources, and the second set of uplink resources are based on the one or more additional grants for the first set of uplink resources. In some cases, each of the grant and the one or more additional grants includes a random access preamble identifier for transmitting the RRC connection request message, each of the random access preamble identifiers of each of the grant and the one or more additional grants having a same value. In some cases, each of the grant and the one or more additional grants includes a random access preamble identifier for transmitting the RRC connection request message, one or more of the random access preamble identifiers of the grant and the one or more additional grants having different values.

In some cases, each of the grant and the one or more additional grants includes a temporary cell identifier for transmitting the RRC connection request message, each of the temporary cell identifiers of each of the grant and the one or more additional grants having a same value. In some cases, each of the grant and the one or more additional grants includes a temporary cell identifier for transmitting the RRC connection request message, one or more of the temporary cell identifiers of the grant and the one or more additional grants having different values.

In some examples, the random access response message manager 1515 may identify beam information associated with the grant for the first set of uplink resources, where the random access response message indicates the beam information, and beam parameters for an uplink beam used to receive the RRC connection request message are based on the beam information. In some cases, the beam information indicates a mapping of one or more beam indexes according to one or more corresponding random access preamble identifiers. In some cases, the beam information indicates one or more downlink beam parameters for a downlink beam used to transmit synchronization signals to the UE, and the uplink beam used to receive the RRC connection request message is based on a correspondence between the downlink beam parameters and the uplink beam parameters for the uplink beam. In some cases, the downlink beam used to transmit the synchronization signals to the UE is different than a second downlink beam used to transmit the random access response message to the UE.

The RRC connection request message manager 1520 may receive the RRC connection request message from the UE using one or more of the first set of uplink resources or a second set of uplink resources, the second set of uplink resources based on the grant for the first set of uplink resources. In some examples, the RRC connection request message manager 1520 may receive a repeated transmission of the RRC connection request message from the UE using one or more of the first set of uplink resources or the second set of uplink resources.

In some examples, the RRC connection request message manager 1520 may receive the RRC connection request message according to the timing information.

In some examples, the RRC connection request message manager 1520 may receive the RRC connection request message using whichever of the first set of uplink resources or the second set of uplink resources has an earliest time component. In some examples, the RRC connection request message manager 1520 may receive the RRC connection request message using whichever of the first set of uplink resources or the second set of uplink resources corresponds to a first successful channel access procedure. In some examples, the RRC connection request message manager 1520 may receive the RRC connection request message using whichever of the first set of uplink resources or the second set of uplink resources is associated with a greatest signal strength.

In some examples, the RRC connection request message manager 1520 may receive the RRC connection request message from the UE using the uplink beam according to the beam parameters.

In some cases, the repeated transmission of the RRC connection request message to the base station is based on grant multiplicity information included in the random access response message.

In some cases, each of the grant and the one or more additional grants includes respective channel access procedure parameters for the first set of uplink resources or the second set of uplink resources, and receiving the RRC connection request message from the UE is based on a successful result of one or more of the channel access procedures according to the respective channel access procedure parameters. In some cases, the channel access procedure parameters include a channel access priority, COT information, or a combination thereof, associated with the corresponding first set of uplink resources or second set of uplink resources.

The connection manager 1525 may establish a connection with the UE based on the RRC connection request message.

The timing information manager 1530 may transmit timing information to the UE, the timing information indicating a time-domain offset between the random access response message, the one or more of the first set of uplink resources, the second set of uplink resources, or a combination thereof.

Figure 16:
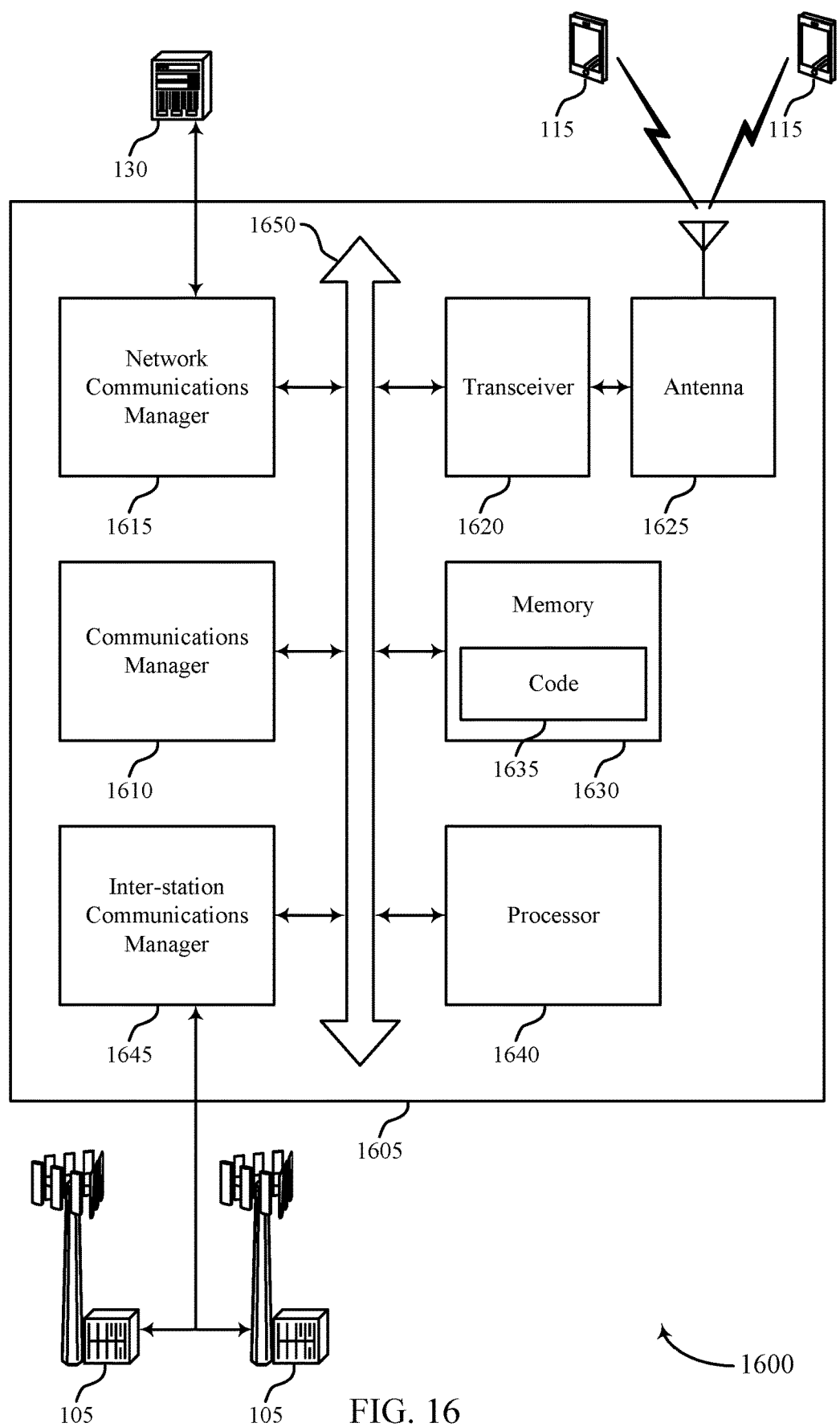
FIG. 16 shows a diagram of a system including a device that supports techniques for using multiple sets of uplink resources in a random access procedure in accordance with aspects of the present disclosure.

FIG. 16 shows a diagram of a system 1600 including a device 1605 that supports techniques for using multiple sets of uplink resources in a random access procedure in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive a random access request message from a UE, transmit a random access response message to the UE in response to the random access request message, the random access response message including a grant for a first set of uplink resources for receiving an RRC connection request message from the UE, receive the RRC connection request message from the UE using one or more of the first set of uplink resources or a second set of uplink resources, the second set of uplink resources based on the grant for the first set of uplink resources, and establish a connection with the UE based on the RRC connection request message.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting techniques for using multiple sets of uplink resources in a random access procedure).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
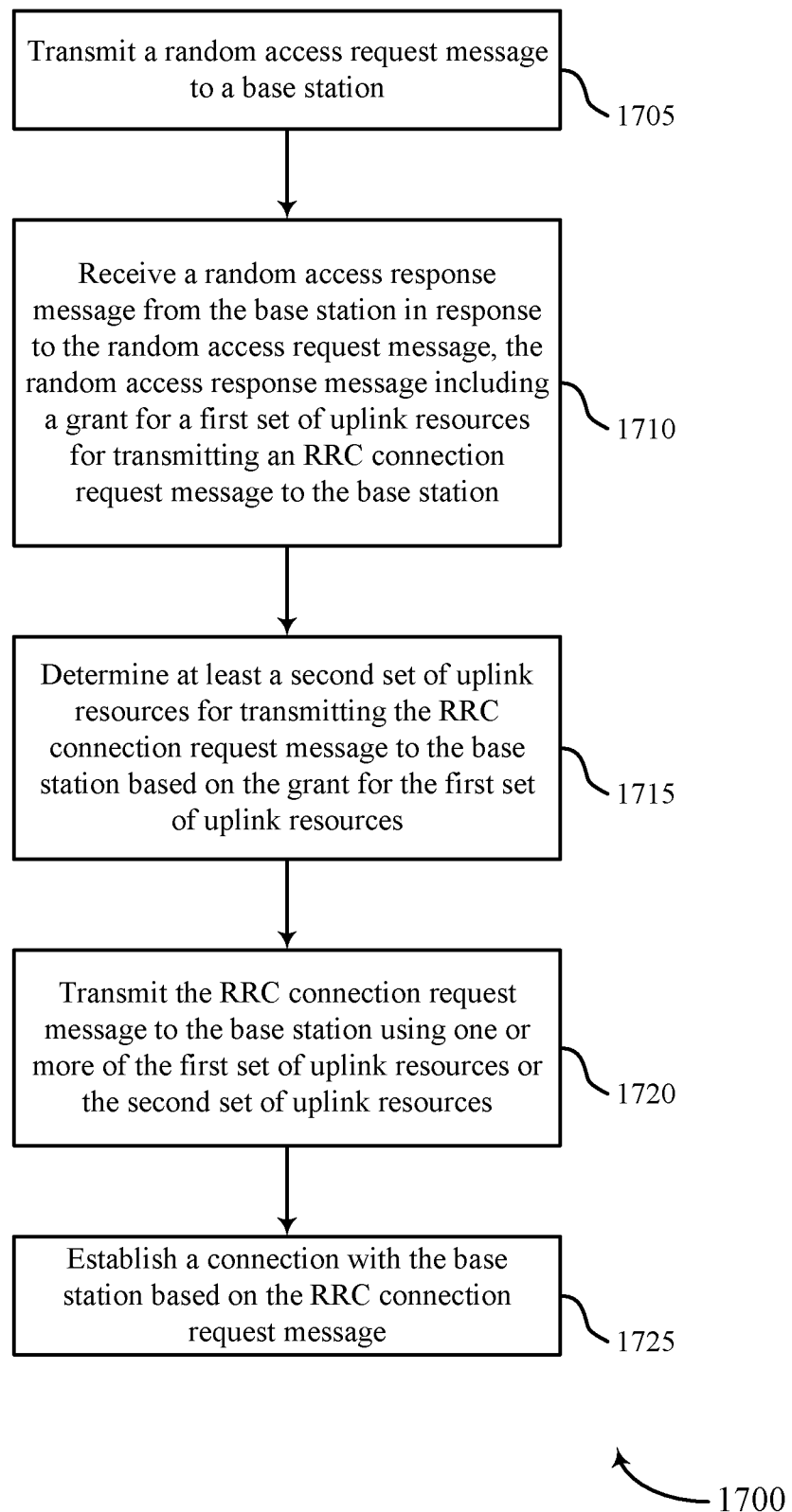
FIGS. 17 through 23 show flowcharts illustrating methods that support techniques for using multiple sets of uplink resources in a random access procedure in accordance with aspects of the present disclosure.

FIG. 17 shows a flowchart illustrating a method 1700 that supports techniques for using multiple sets of uplink resources in a random access procedure in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit a random access request message to a base station. The operations of 1705 may be performed according to the methods described herein. In some examples, aspects of the operations of 1705 may be performed by a random access request message module as described with reference to FIGS. 9 through 12.

At 1710, the UE may receive a random access response message from the base station in response to the random access request message, the random access response message including a grant for a first set of uplink resources for transmitting an RRC connection request message to the base station. The operations of 1710 may be performed according to the methods described herein. In some examples, aspects of the operations of 1710 may be performed by a random access response message module as described with reference to FIGS. 9 through 12.

At 1715, the UE may determine at least a second set of uplink resources for transmitting the RRC connection request message to the base station based on the grant for the first set of uplink resources. The operations of 1715 may be performed according to the methods described herein. In some examples, aspects of the operations of 1715 may be performed by an RRC connection request message module as described with reference to FIGS. 9 through 12.

At 1720, the UE may transmit the RRC connection request message to the base station using one or more of the first set of uplink resources or the second set of uplink resources. The operations of 1720 may be performed according to the methods described herein. In some examples, aspects of the operations of 1720 may be performed by an RRC connection request message module as described with reference to FIGS. 9 through 12.

At 1725, the UE may establish a connection with the base station based on the RRC connection request message. The operations of 1725 may be performed according to the methods described herein. In some examples, aspects of the operations of 1725 may be performed by a connection module as described with reference to FIGS. 9 through 12.

Figure 18:
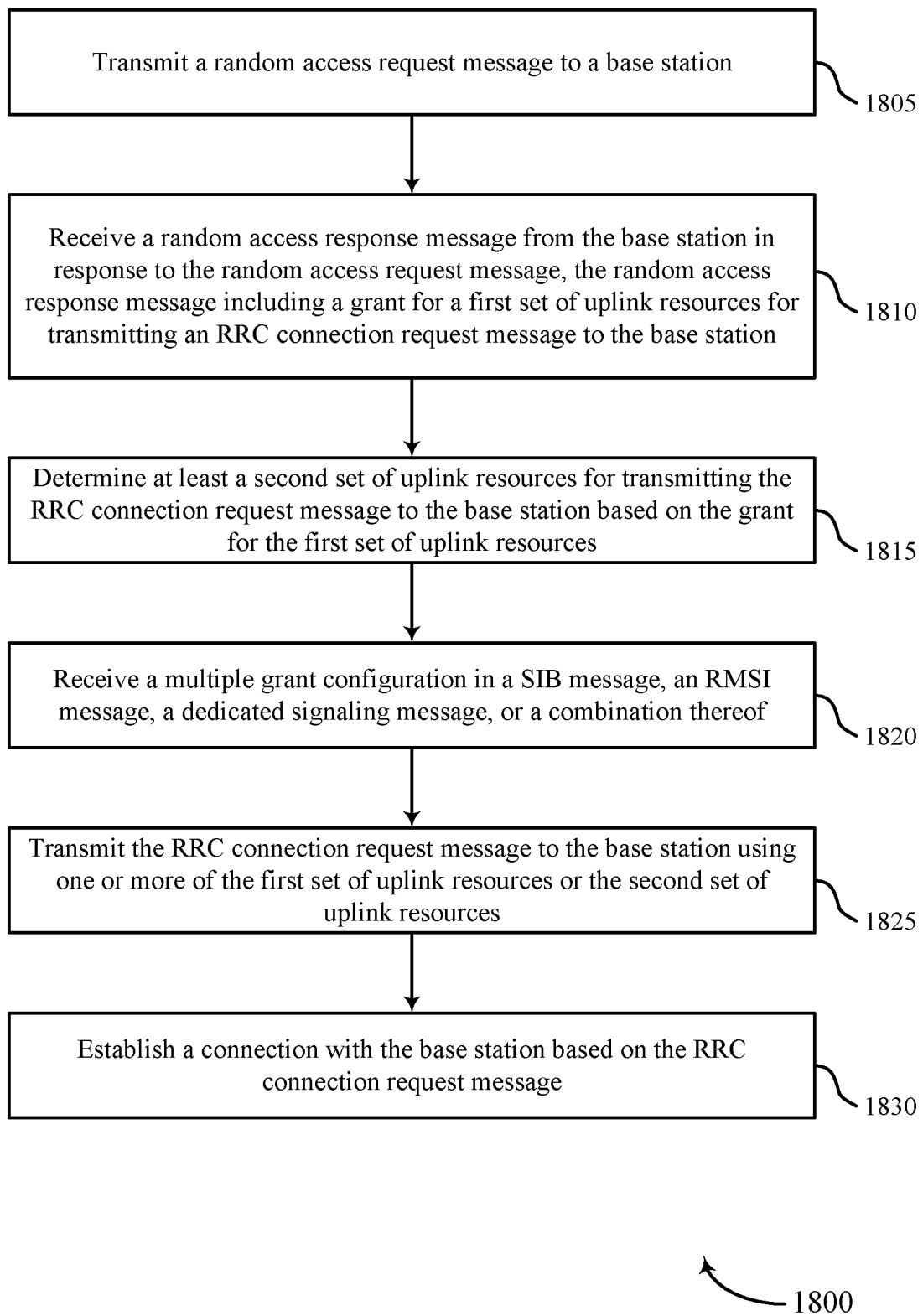

FIG. 18 shows a flowchart illustrating a method 1800 that supports techniques for using multiple sets of uplink resources in a random access procedure in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit a random access request message to a base station. The operations of 1805 may be performed according to the methods described herein. In some examples, aspects of the operations of 1805 may be performed by a random access request message module as described with reference to FIGS. 9 through 12.

At 1810, the UE may receive a random access response message from the base station in response to the random access request message, the random access response message including a grant for a first set of uplink resources for transmitting an RRC connection request message to the base station. The operations of 1810 may be performed according to the methods described herein. In some examples, aspects of the operations of 1810 may be performed by a random access response message module as described with reference to FIGS. 9 through 12.

At 1815, the UE may determine at least a second set of uplink resources for transmitting the RRC connection request message to the base station based on the grant for the first set of uplink resources. The operations of 1815 may be performed according to the methods described herein. In some examples, aspects of the operations of 1815 may be performed by an RRC connection request message module as described with reference to FIGS. 9 through 12.

At 1820, the UE may receive a multiple grant configuration in a SIB message, an RMSI, a dedicated signaling message, or a combination thereof. The operations of 1820 may be performed according to the methods described herein. In some examples, aspects of the operations of 1820 may be performed by a multiple grant configuration module as described with reference to FIGS. 9 through 12.

At 1825, the UE may transmit the RRC connection request message to the base station using one or more of the first set of uplink resources or the second set of uplink resources. The operations of 1825 may be performed according to the methods described herein. In some examples, aspects of the operations of 1825 may be performed by an RRC connection request message module as described with reference to FIGS. 9 through 12.

At 1830, the UE may establish a connection with the base station based on the RRC connection request message. The operations of 1830 may be performed according to the methods described herein. In some examples, aspects of the operations of 1830 may be performed by a connection module as described with reference to FIGS. 9 through 12.

Figure 19:
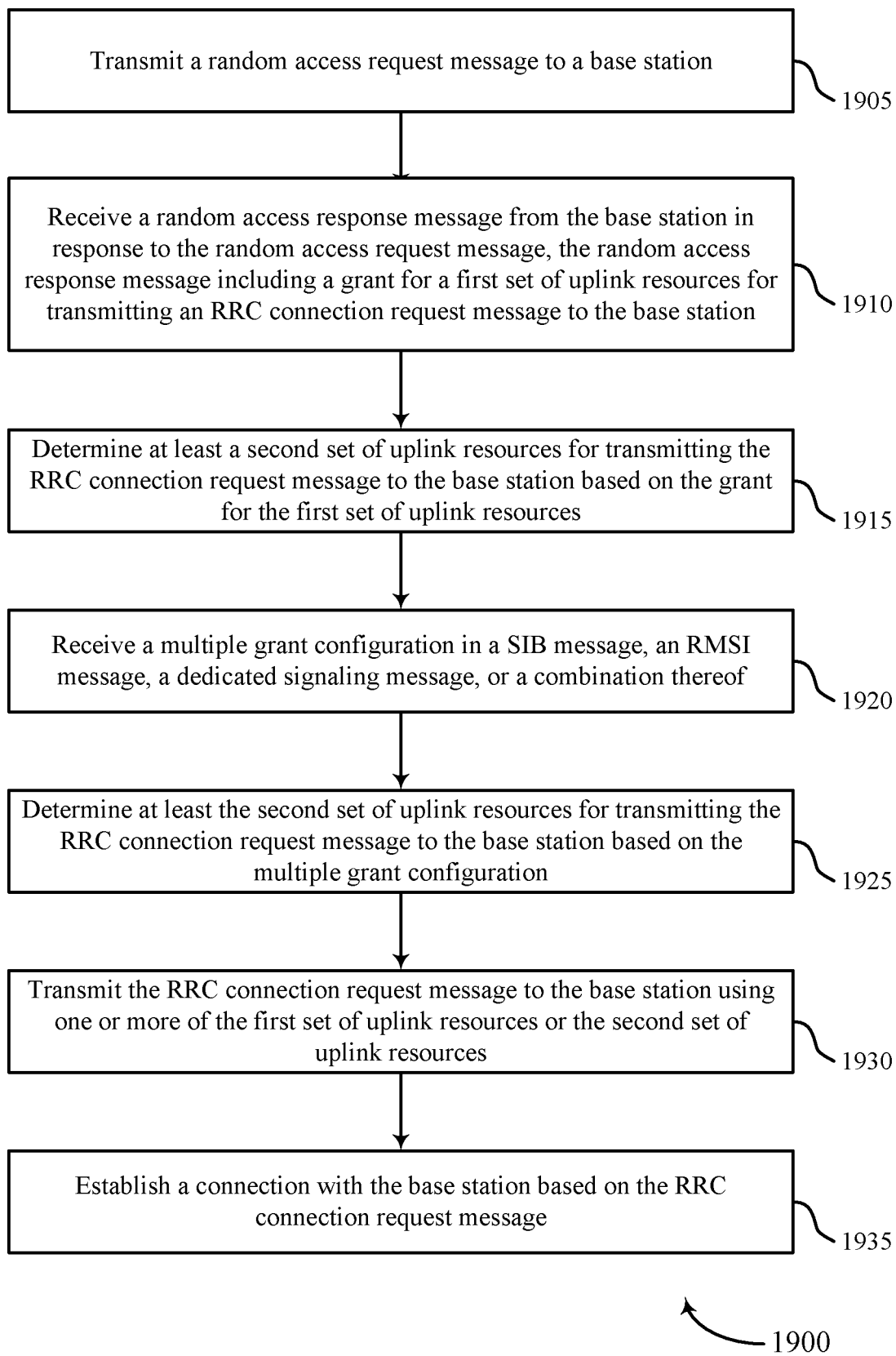

FIG. 19 shows a flowchart illustrating a method 1900 that supports techniques for using multiple sets of uplink resources in a random access procedure in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit a random access request message to a base station. The operations of 1905 may be performed according to the methods described herein. In some examples, aspects of the operations of 1905 may be performed by a random access request message module as described with reference to FIGS. 9 through 12.

At 1910, the UE may receive a random access response message from the base station in response to the random access request message, the random access response message including a grant for a first set of uplink resources for transmitting an RRC connection request message to the base station. The operations of 1910 may be performed according to the methods described herein. In some examples, aspects of the operations of 1910 may be performed by a random access response message module as described with reference to FIGS. 9 through 12.

At 1915, the UE may determine at least a second set of uplink resources for transmitting the RRC connection request message to the base station based on the grant for the first set of uplink resources. The operations of 1915 may be performed according to the methods described herein. In some examples, aspects of the operations of 1915 may be performed by an RRC connection request message module as described with reference to FIGS. 9 through 12.

At 1920, the UE may receive a multiple grant configuration in a SIB message, an RMSI, a dedicated signaling message, or a combination thereof. The operations of 1920 may be performed according to the methods described herein. In some examples, aspects of the operations of 1920 may be performed by a multiple grant configuration module as described with reference to FIGS. 9 through 12.

At 1925, the UE may determine at least the second set of uplink resources for transmitting the RRC connection request message to the base station based on the multiple grant configuration. The operations of 1925 may be performed according to the methods described herein. In some examples, aspects of the operations of 1925 may be performed by a multiple grant configuration module as described with reference to FIGS. 9 through 12.

At 1930, the UE may transmit the RRC connection request message to the base station using one or more of the first set of uplink resources or the second set of uplink resources. The operations of 1930 may be performed according to the methods described herein. In some examples, aspects of the operations of 1930 may be performed by an RRC connection request message module as described with reference to FIGS. 9 through 12.

At 1935, the UE may establish a connection with the base station based on the RRC connection request message. The operations of 1935 may be performed according to the methods described herein. In some examples, aspects of the operations of 1935 may be performed by a connection module as described with reference to FIGS. 9 through 12.

Figure 20:
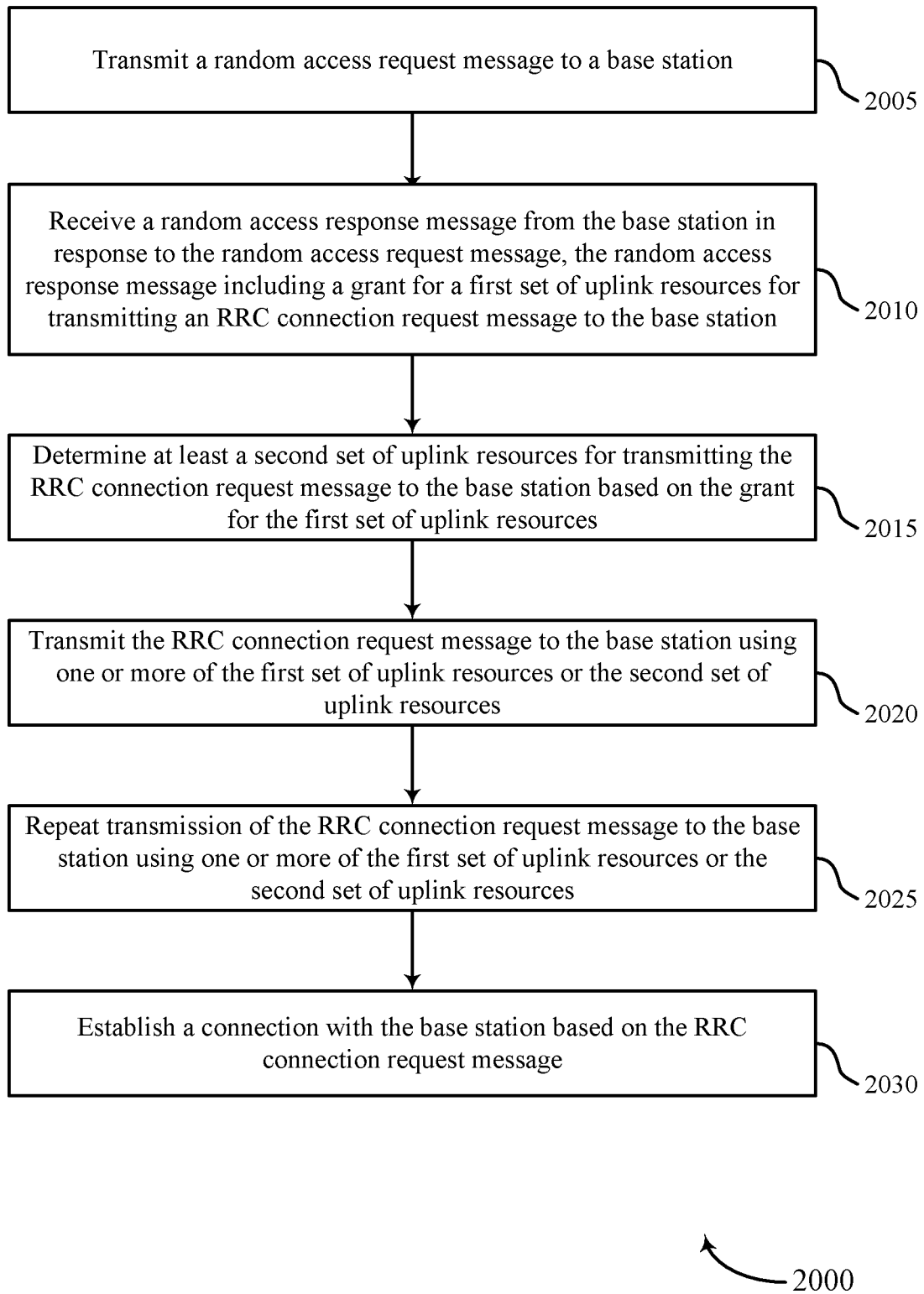

FIG. 20 shows a flowchart illustrating a method 2000 that supports techniques for using multiple sets of uplink resources in a random access procedure in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may transmit a random access request message to a base station. The operations of 2005 may be performed according to the methods described herein. In some examples, aspects of the operations of 2005 may be performed by a random access request message module as described with reference to FIGS. 9 through 12.

At 2010, the UE may receive a random access response message from the base station in response to the random access request message, the random access response message including a grant for a first set of uplink resources for transmitting an RRC connection request message to the base station. The operations of 2010 may be performed according to the methods described herein. In some examples, aspects of the operations of 2010 may be performed by a random access response message module as described with reference to FIGS. 9 through 12.

At 2015, the UE may determine at least a second set of uplink resources for transmitting the RRC connection request message to the base station based on the grant for the first set of uplink resources. The operations of 2015 may be performed according to the methods described herein. In some examples, aspects of the operations of 2015 may be performed by an RRC connection request message module as described with reference to FIGS. 9 through 12.

At 2020, the UE may transmit the RRC connection request message to the base station using one or more of the first set of uplink resources or the second set of uplink resources. The operations of 2020 may be performed according to the methods described herein. In some examples, aspects of the operations of 2020 may be performed by an RRC connection request message module as described with reference to FIGS. 9 through 12.

At 2025, the UE may repeat transmission of the RRC connection request message to the base station using one or more of the first set of uplink resources or the second set of uplink resources. The operations of 2025 may be performed according to the methods described herein. In some examples, aspects of the operations of 2025 may be performed by an RRC connection request message module as described with reference to FIGS. 9 through 12.

At 2030, the UE may establish a connection with the base station based on the RRC connection request message. The operations of 2030 may be performed according to the methods described herein. In some examples, aspects of the operations of 2030 may be performed by a connection module as described with reference to FIGS. 9 through 12.

Figure 21:
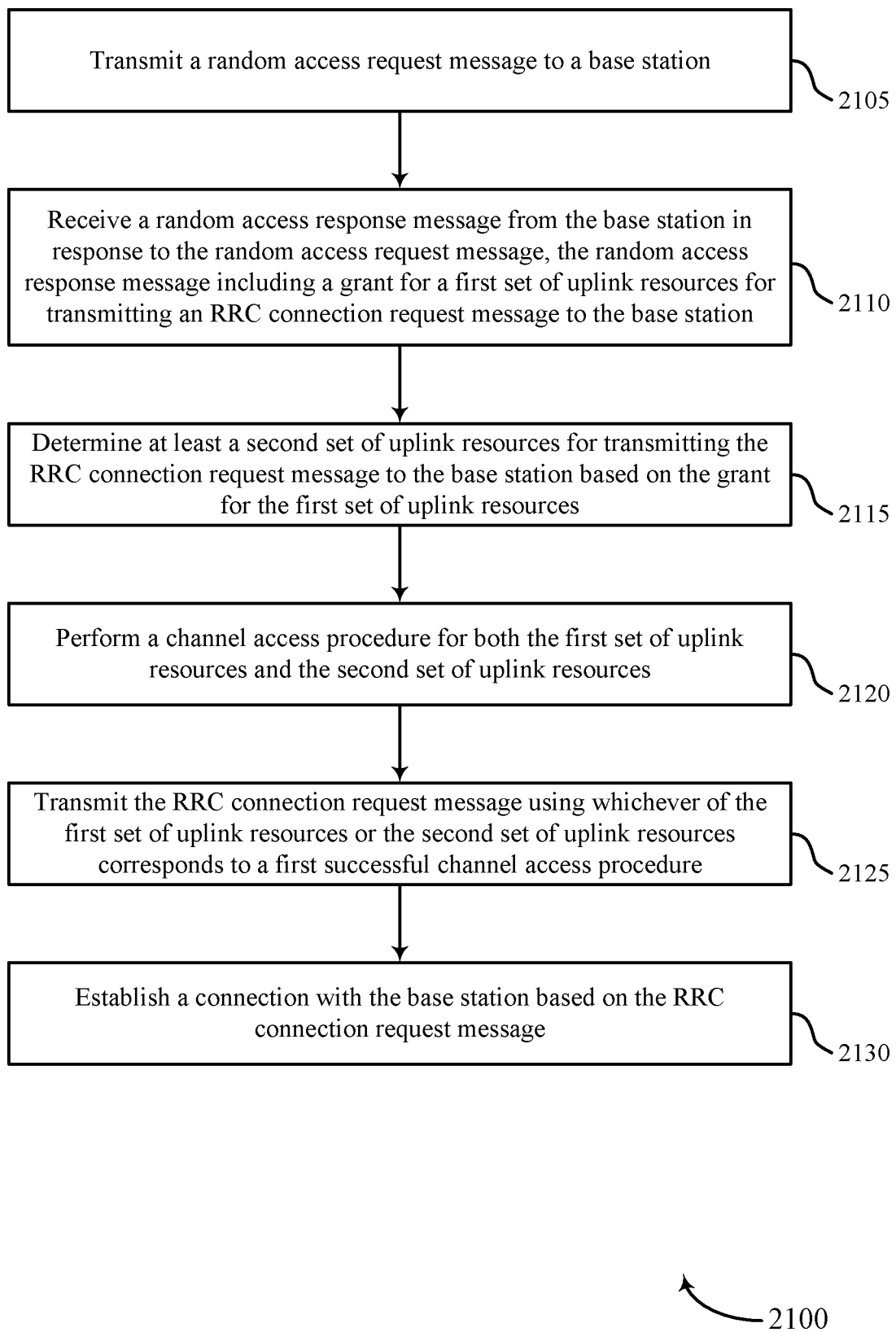

FIG. 21 shows a flowchart illustrating a method 2100 that supports techniques for using multiple sets of uplink resources in a random access procedure in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may transmit a random access request message to a base station. The operations of 2105 may be performed according to the methods described herein. In some examples, aspects of the operations of 2105 may be performed by a random access request message module as described with reference to FIGS. 9 through 12.

At 2110, the UE may receive a random access response message from the base station in response to the random access request message, the random access response message including a grant for a first set of uplink resources for transmitting an RRC connection request message to the base station. The operations of 2110 may be performed according to the methods described herein. In some examples, aspects of the operations of 2110 may be performed by a random access response message module as described with reference to FIGS. 9 through 12.

At 2115, the UE may determine at least a second set of uplink resources for transmitting the RRC connection request message to the base station based on the grant for the first set of uplink resources. The operations of 2115 may be performed according to the methods described herein. In some examples, aspects of the operations of 2115 may be performed by an RRC connection request message module as described with reference to FIGS. 9 through 12.

At 2120, the UE may perform a channel access procedure for both the first set of uplink resources and the second set of uplink resources. The operations of 2120 may be performed according to the methods described herein. In some examples, aspects of the operations of 2120 may be performed by a channel access procedure module as described with reference to FIGS. 9 through 12.

At 2125, the UE may transmit the RRC connection request message using whichever of the first set of uplink resources or the second set of uplink resources corresponds to a first successful channel access procedure. The operations of 2125 may be performed according to the methods described herein. In some examples, aspects of the operations of 2125 may be performed by an RRC connection request message module as described with reference to FIGS. 9 through 12.

At 2130, the UE may establish a connection with the base station based on the RRC connection request message. The operations of 2130 may be performed according to the methods described herein. In some examples, aspects of the operations of 2130 may be performed by a connection module as described with reference to FIGS. 9 through 12.

Figure 22:
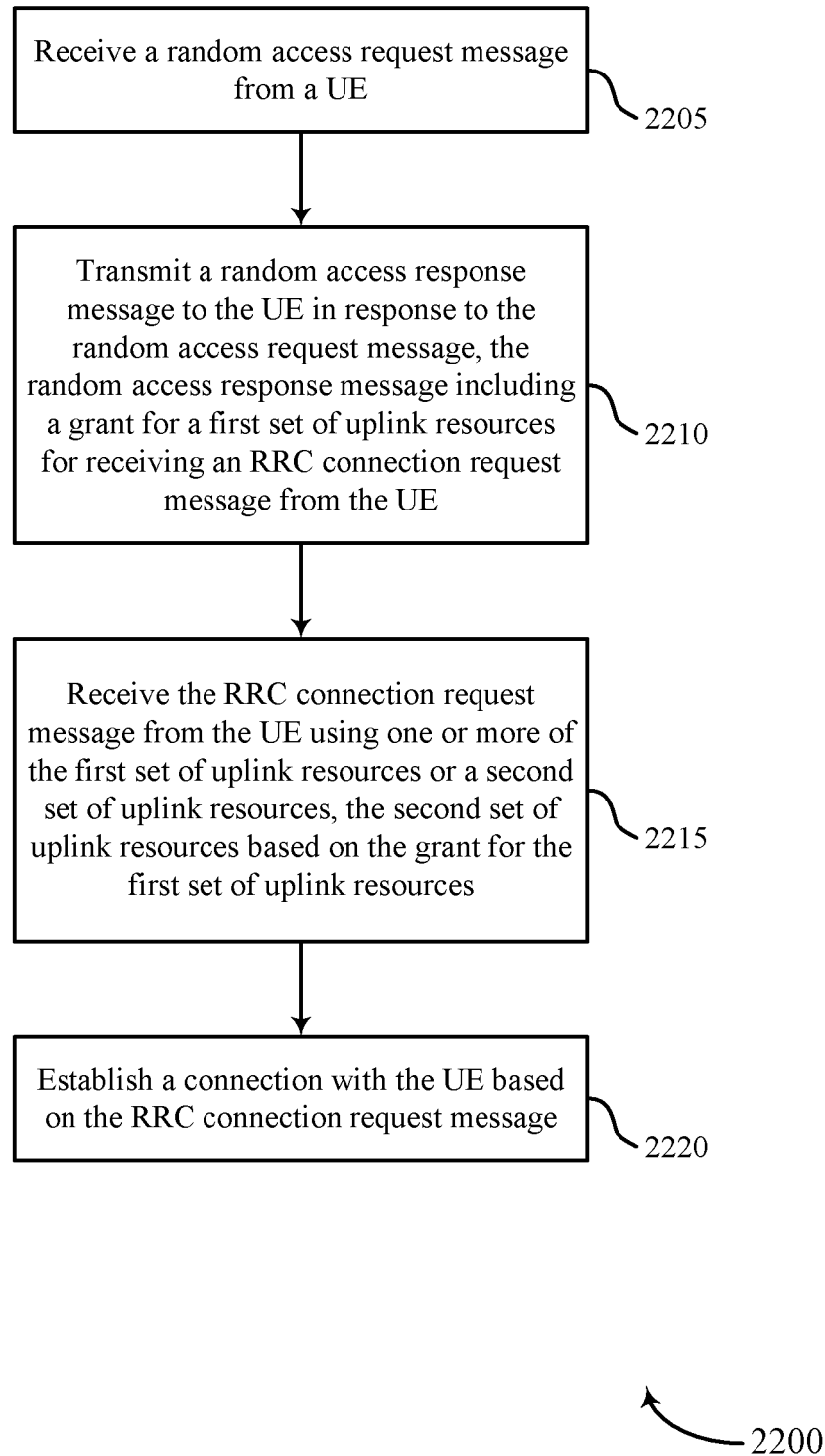

FIG. 22 shows a flowchart illustrating a method 2200 that supports techniques for using multiple sets of uplink resources in a random access procedure in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may receive a random access request message from a UE. The operations of 2205 may be performed according to the methods described herein. In some examples, aspects of the operations of 2205 may be performed by a random access request message manager as described with reference to FIGS. 13 through 16.

At 2210, the base station may transmit a random access response message to the UE in response to the random access request message, the random access response message including a grant for a first set of uplink resources for receiving an RRC connection request message from the UE. The operations of 2210 may be performed according to the methods described herein. In some examples, aspects of the operations of 2210 may be performed by a random access response message manager as described with reference to FIGS. 13 through 16.

At 2215, the base station may receive the RRC connection request message from the UE using one or more of the first set of uplink resources or a second set of uplink resources, the second set of uplink resources based on the grant for the first set of uplink resources. The operations of 2215 may be performed according to the methods described herein. In some examples, aspects of the operations of 2215 may be performed by an RRC connection request message manager as described with reference to FIGS. 13 through 16.

At 2220, the base station may establish a connection with the UE based on the RRC connection request message. The operations of 2220 may be performed according to the methods described herein. In some examples, aspects of the operations of 2220 may be performed by a connection manager as described with reference to FIGS. 13 through 16.

Figure 23:
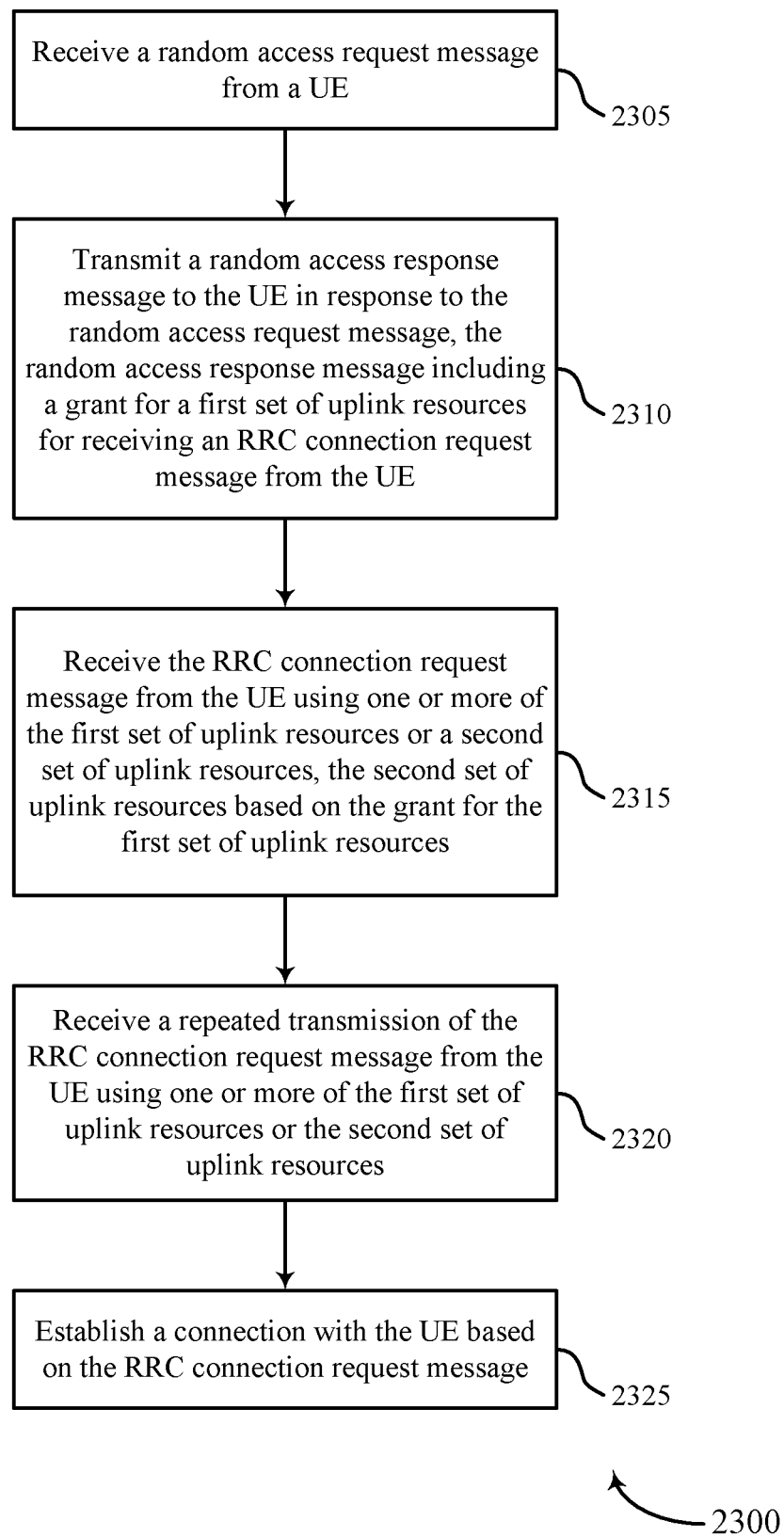

FIG. 23 shows a flowchart illustrating a method 2300 that supports techniques for using multiple sets of uplink resources in a random access procedure in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may receive a random access request message from a UE. The operations of 2305 may be performed according to the methods described herein. In some examples, aspects of the operations of 2305 may be performed by a random access request message manager as described with reference to FIGS. 13 through 16.

At 2310, the base station may transmit a random access response message to the UE in response to the random access request message, the random access response message including a grant for a first set of uplink resources for receiving an RRC connection request message from the UE. The operations of 2310 may be performed according to the methods described herein. In some examples, aspects of the operations of 2310 may be performed by a random access response message manager as described with reference to FIGS. 13 through 16.

At 2315, the base station may receive the RRC connection request message from the UE using one or more of the first set of uplink resources or a second set of uplink resources, the second set of uplink resources based on the grant for the first set of uplink resources. The operations of 2315 may be performed according to the methods described herein. In some examples, aspects of the operations of 2315 may be performed by an RRC connection request message manager as described with reference to FIGS. 13 through 16.

At 2320, the base station may receive a repeated transmission of the RRC connection request message from the UE using one or more of the first set of uplink resources or the second set of uplink resources. The operations of 2320 may be performed according to the methods described herein. In some examples, aspects of the operations of 2320 may be performed by an RRC connection request message manager as described with reference to FIGS. 13 through 16.

At 2325, the base station may establish a connection with the UE based on the RRC connection request message. The operations of 2325 may be performed according to the methods described herein. In some examples, aspects of the operations of 2325 may be performed by a connection manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting a random access request message to a base station;
   receiving a random access response message from the base station in response to the random access request message, the random access response message comprising a grant for a first set of uplink resources for transmitting a radio resource control connection request message to the base station;
   determining at least a second set of uplink resources for transmitting the radio resource control connection request message to the base station based at least in part on a relationship between the first set of uplink resources and the second set of uplink resources, and the grant for the first set of uplink resources;
   performing a channel access procedure for both the first set of uplink resources and the second set of uplink resources;
   transmitting, based at least in part on performing the channel access procedure, the radio resource control connection request message to the base station using one or more of the first set of uplink resources or the second set of uplink resources; and
   establishing a connection with the base station based at least in part on the radio resource control connection request message.

2. The method of claim 1, further comprising:
   receiving timing information from the base station, the timing information indicating a time-domain offset between the random access response message, the one or more of the first set of uplink resources, the second set of uplink resources, or a combination thereof; and
   transmitting the radio resource control connection request message according to the timing information.

3. The method of claim 1, further comprising:
   receiving a multiple grant configuration in a system information block message, a remaining minimum system information message, a dedicated signaling message, or a combination thereof.

4. The method of claim 3, further comprising:
   determining at least the second set of uplink resources for transmitting the radio resource control connection request message to the base station based at least in part on the multiple grant configuration.

5. The method of claim 3, wherein the multiple grant configuration indicates a maximum number of grants, the relationship between the first set of uplink resources and the second set of uplink resources, a modulation and coding scheme, or a combination thereof.

6. The method of claim 1, further comprising:
   repeating transmission of the radio resource control connection request message to the base station using one or more of the first set of uplink resources or the second set of uplink resources.

7. The method of claim 6, wherein the random access response message comprises grant multiplicity information, the grant multiplicity information indicating a number of grants to be used for repeating transmission of the radio resource control connection request message, and wherein repeating transmission of the radio resource control connection request message to the base station is based at least in part on the grant multiplicity information.

8. The method of claim 1, wherein the random access response message comprises one or more additional grants for at least the second set of uplink resources, and determining at least the second set of uplink resources is based at least in part on the one or more additional grants.

9. The method of claim 8, wherein each of the grant and the one or more additional grants comprises a random access preamble identifier, or a temporary cell identifier, or both, for transmitting the radio resource control connection request message, each random access preamble identifier or each temporary cell identifier, or both, of each of the grant and the one or more additional grants having a same value.

10. The method of claim 8, wherein each of the grant and the one or more additional grants comprises a temporary cell identifier for transmitting the radio resource control connection request message, one or more of the temporary cell identifiers of the grant and the one or more additional grants having different values.

11. The method of claim 1, further comprising:
    transmitting the radio resource control connection request message using whichever of the first set of uplink resources or the second set of uplink resources has an earliest time component.

12. The method of claim 1, further comprising:
    transmitting the radio resource control connection request message using whichever of the first set of uplink resources or the second set of uplink resources corresponds to a first successful channel access procedure.

13. The method of claim 1, wherein each of the grant and one or more additional grants for at least the second set of uplink resources comprises respective channel access procedure parameters for the first set of uplink resources or the second set of uplink resources, and transmitting the radio resource control connection request message to the base station is based at least in part on a successful result of the channel access procedure according to the respective channel access procedure parameters.

14. The method of claim 13, wherein the channel access procedure parameters comprise a channel access priority, channel occupancy time information, or a combination thereof, for the first set of uplink resources or the second set of uplink resources.

15. The method of claim 1, further comprising:
determining a signal strength associated with each of the first set of uplink resources and the second set of uplink resources; and
transmitting the radio resource control connection request message using whichever of the first set of uplink resources or the second set of uplink resources is associated with a greatest signal strength.

16. A method for wireless communications at a base station, comprising:
receiving a random access request message from a user equipment (UE);
transmitting a random access response message to the UE in response to the random access request message, the random access response message comprising a grant for a first set of uplink resources for receiving a radio resource control connection request message from the UE;
receiving the radio resource control connection request message from the UE using one or more of the first set of uplink resources or a second set of uplink resources, wherein one or both of the first set of uplink resources or the second set of uplink resources corresponds to a successful channel access procedure, and wherein the second set of uplink resources is based at least in part on a relationship between the first set of uplink resources and the second set of uplink resources, and the grant for the first set of uplink resources; and
establishing a connection with the UE based at least in part on the radio resource control connection request message.

17. The method of claim 16, further comprising:
transmitting timing information to the UE, the timing information indicating a time-domain offset between the random access response message, the one or more of the first set of uplink resources, the second set of uplink resources, or a combination thereof; and
receiving the radio resource control connection request message according to the timing information.

18. The method of claim 16, further comprising:
receiving a repeated transmission of the radio resource control connection request message from the UE using one or more of the first set of uplink resources or the second set of uplink resources.

19. The method of claim 18, wherein the repeated transmission of the radio resource control connection request message to the base station is based at least in part on grant multiplicity information included in the random access response message.

20. The method of claim 16, wherein the random access response message comprises one or more additional grants for the first set of uplink resources, and the second set of uplink resources are based at least in part on the one or more additional grants for the first set of uplink resources.

21. The method of claim 20, wherein each of the grant and the one or more additional grants comprises a random access preamble identifier, or a temporary cell identifier, or both, for transmitting the radio resource control connection request message, each random access preamble identifier or each temporary cell identifier, or both, of each of the grant and the one or more additional grants having a same value.

22. The method of claim 20, wherein each of the grant and the one or more additional grants comprises a temporary cell identifier for transmitting the radio resource control connection request message, one or more of the temporary cell identifiers of the grant and the one or more additional grants having different values.

23. The method of claim 16, further comprising:
receiving the radio resource control connection request message using whichever of the first set of uplink resources or the second set of uplink resources has an earliest time component, using whichever of the first set of uplink resources or the second set of uplink resources corresponds to a first successful channel access procedure, using whichever of the first set of uplink resources or the second set of uplink resources is associated with a greatest signal strength, or a combination thereof.

24. The method of claim 16, wherein each of the grant and one or more additional grants for the first set of uplink resources comprises respective channel access procedure parameters for the first set of uplink resources or the second set of uplink resources, and receiving the radio resource control connection request message from the UE is based at least in part on the successful result of the channel access procedure according to the respective channel access procedure parameters, and wherein the channel access procedure parameters comprise a channel access priority, channel occupancy time information, or a combination thereof, associated with the corresponding first set of uplink resources or second set of uplink resources.

25. An apparatus for wireless communications at a user equipment (UE), comprising:
a processor,
memory coupled with the processor; and
instructions stored in the memory, wherein the instructions are executable by the processor to:
transmit a random access request message to a base station;
receive a random access response message from the base station in response to the random access request message, the random access response message comprising a grant for a first set of uplink resources for transmitting a radio resource control connection request message to the base station;
determine at least a second set of uplink resources for transmitting the radio resource control connection request message to the base station based at least in part on a relationship between the first set of uplink resources and the second set of uplink resources, and the grant for the first set of uplink resources;
perform a channel access procedure for both the first set of uplink resources and the second set of uplink resources;
transmit, based at least in part on performing the channel access procedure, the radio resource control connection request message to the base station using one or more of the first set of uplink resources or the second set of uplink resources; and
establish a connection with the base station based at least in part on the radio resource control connection request message.

26. The apparatus of claim 25, wherein the instructions are further executable by the processor to:
receive timing information from the base station, the timing information indicating a time-domain offset between the random access response message, the one or more of the first set of uplink resources, the second set of uplink resources, or a combination thereof; and
transmit the radio resource control connection request message according to the timing information.

27. The apparatus of claim 25, wherein the instructions are further executable by the processor to:

receive a multiple grant configuration in a system information block message, a remaining minimum system information message, a dedicated signaling message, or a combination thereof.

28. An apparatus for wireless communications at a base station, comprising:
a processor;
memory coupled with the processor; and
instructions stored in the memory and executable by the processor to:
receive a random access request message from a user equipment (UE);
transmit a random access response message to the UE in response to the random access request message, the random access response message comprising a grant for a first set of uplink resources for receiving a radio resource control connection request message from the UE;
receive the radio resource control connection request message from the UE using one or more of the first set of uplink resources or a second set of uplink resources, wherein one or both of the first set of uplink resources or the second set of uplink resources corresponds to a successful channel access procedure, and wherein the second set of uplink resources is based at least in part on a relationship between the first set of uplink resources and the second set of uplink resources, and the grant for the first set of uplink resources; and
establish a connection with the UE based at least in part on the radio resource control connection request message.

29. The apparatus of claim 28, wherein the instructions are further executable by the processor to:
transmit timing information to the UE, the timing information indicating a time-domain offset between the random access response message, the one or more of the first set of uplink resources, the second set of uplink resources, or a combination thereof; and
receive the radio resource control connection request message according to the timing information.

30. The apparatus of claim 28, wherein the instructions are further executable by the processor to:
receive a repeated transmission of the radio resource control connection request message from the UE using one or more of the first set of uplink resources or the second set of uplink resources.

* * * * *